US012488545B2

(12) United States Patent
Otsuki et al.

(10) Patent No.: US 12,488,545 B2
(45) Date of Patent: Dec. 2, 2025

(54) TERMINAL DEVICE, APPLICATION SERVER, RECEIVING METHOD, AND TRANSMITTING METHOD

(71) Applicant: Sony Group Corporation, Tokyo (JP)

(72) Inventors: Hiroto Otsuki, Tokyo (JP); Daisuke Sasaki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 428 days.

(21) Appl. No.: 18/331,195

(22) Filed: Jun. 8, 2023

(65) Prior Publication Data

US 2023/0316684 A1 Oct. 5, 2023

Related U.S. Application Data

(63) Continuation of application No. 17/764,983, filed as application No. PCT/JP2020/047059 on Dec. 16, 2020, now Pat. No. 11,836,876.

(30) Foreign Application Priority Data

Dec. 23, 2019 (JP) ................................ 2019-232069

(51) Int. Cl.
*H04W 24/10* (2009.01)
*G06T 19/00* (2011.01)
*H04L 67/131* (2022.01)

(52) U.S. Cl.
CPC .......... *G06T 19/006* (2013.01); *H04L 67/131* (2022.05)

(58) Field of Classification Search
CPC ..... H04W 24/10; H04W 64/00; H04W 4/029; H04W 16/28
See application file for complete search history.

(56) References Cited

U.S. PATENT DOCUMENTS

2019/0037529 A1 1/2019 Edge
2019/0069000 A1 2/2019 Hou et al.
(Continued)

FOREIGN PATENT DOCUMENTS

JP 2003-204481 A 7/2003
JP 2017-17655 A 1/2017
(Continued)

OTHER PUBLICATIONS

International Search Report and Written Opinion mailed on Mar. 2, 2021, received for PCT Application PCT/JP2020/047059, Filed on Dec. 16, 2020, 8 pages.
(Continued)

*Primary Examiner* — Sam Bhattacharya
(74) *Attorney, Agent, or Firm* — XSENSUS LLP

(57) ABSTRACT

A terminal device (10) includes a transceiver (110), a camera (140), a display (130), and a processor (150). The processor (150) determines a first synchronization signal whose radio quality satisfies a predetermined threshold from a plurality of synchronization signals beamformed and transmitted from the base station (20), and reports the first synchronization signal to the base station (20). The processor (150) superimposes a virtual object corrected by using correction information on a captured image of the camera (140) and displays the image on the display (130). The correction information is information for indicating a position of an area covered by the first synchronization signal with respect to a real object. The correction information includes information regarding a direction of the virtual object to be displayed on the display (130) in the area and a distance from the real object to the area.

18 Claims, 19 Drawing Sheets

(56) References Cited

U.S. PATENT DOCUMENTS

2019/0385379 A1 12/2019 Woo
2021/0212012 A1* 7/2021 Qi ......................... H04W 16/22

FOREIGN PATENT DOCUMENTS

WO 2010/029671 A1 3/2010
WO 2016/017121 A1 2/2016
WO 2017/183346 A1 10/2017
WO 2019/048866 A1 3/2019

OTHER PUBLICATIONS

3GPP, "Service requirements for the 5G system; Stage 1 (Release 17)" 3GPP TS 22.261 V17.0.1, Oct. 2019, 83 pages.
3GPP, "Study on Network Controlled Interactive Services (Release 17)" 3GPP TR 22.842 V17.1.0, Sep. 2019, pp. 1-29.
Dieter Schmalstieg, et al., "AR Textbook", Mynavi Publishing Corporation, published on Jul. 30, 2018, 524 pages. (Cited in the Specification).
"3rd Generation Partnership Project; Technical Specification Group Radio Access Network; NG-RAN; NR Positioning Protocol A (NRPPa) (Release 15)", Mar. 27, 2018 (Mar. 27, 2018), XP051416551.
ZTE: "Enhance E-CID positioning with SSB information", 3GPP Draft; R2-1816510, 3rd Generation Partnership Project (3GPP), Mobile Competence Centre ; Nov. 12, 2018 (Nov. 2, 2018), pp. 1-4, XP051480464.

* cited by examiner

M1
M2
V1
R1
ST
20A
20B
10A
10B
B1
B2
B3
L1
L2
S1
S2
S3
TRANSMIT SYNCHRONIZATION SIGNAL WHILE SWEEPING BEAM
DETERMINE BEAM B2 AS BEST BEAM
GENERATE AR IMAGE BASED ON LINE-OF-SIGHT DIRECTION OF USER CORRESPONDING TO BEAM

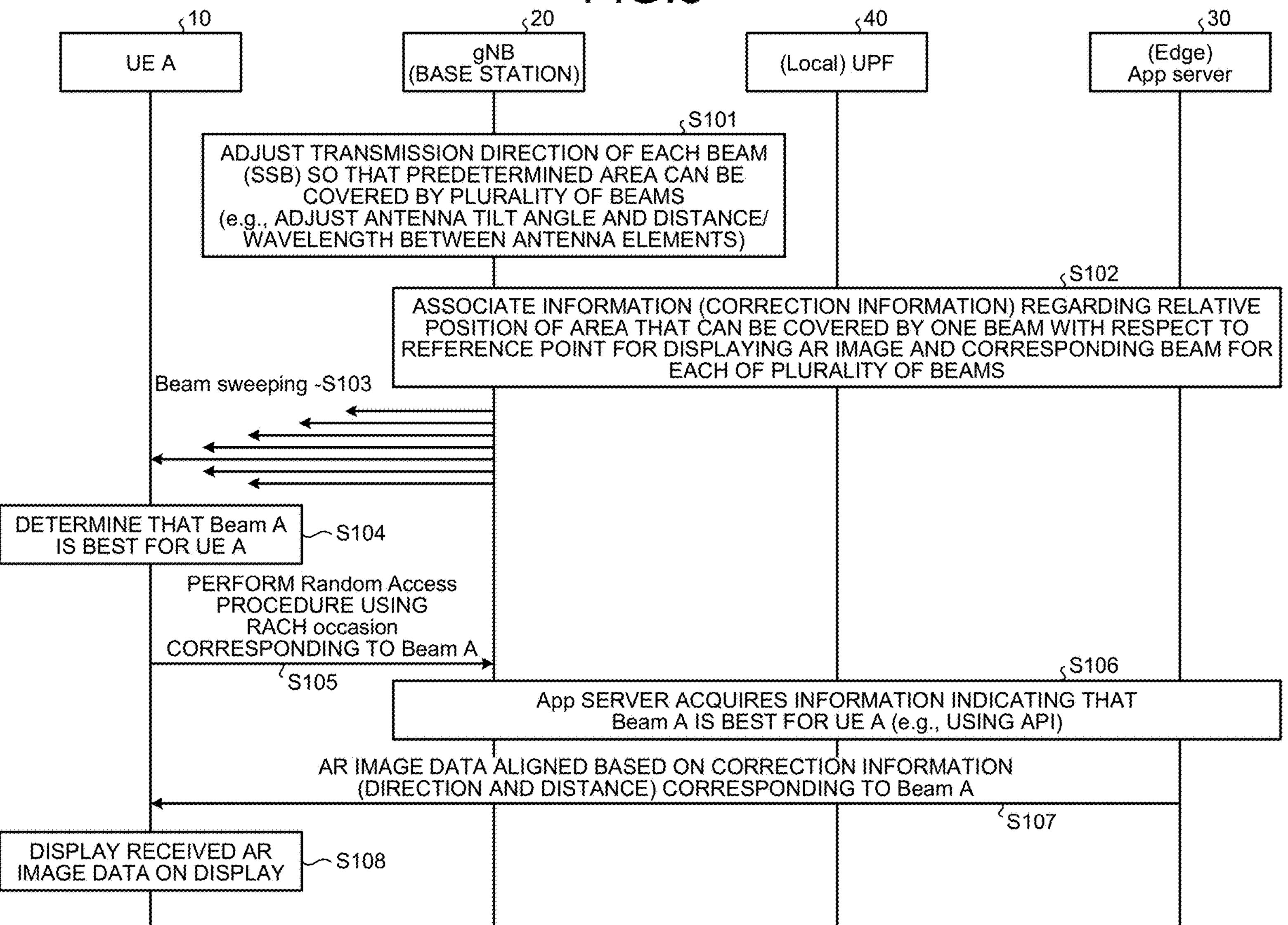
FIG.8
10 UE A
20 gNB (BASE STATION)
40 (Local) UPF
30 (Edge) App server
S101 ADJUST TRANSMISSION DIRECTION OF EACH BEAM (SSB) SO THAT PREDETERMINED AREA CAN BE COVERED BY PLURALITY OF BEAMS (e.g., ADJUST ANTENNA TILT ANGLE AND DISTANCE/ WAVELENGTH BETWEEN ANTENNA ELEMENTS)
S102 ASSOCIATE INFORMATION (CORRECTION INFORMATION) REGARDING RELATIVE POSITION OF AREA THAT CAN BE COVERED BY ONE BEAM WITH RESPECT TO REFERENCE POINT FOR DISPLAYING AR IMAGE AND CORRESPONDING BEAM FOR EACH OF PLURALITY OF BEAMS
Beam sweeping ~S103
DETERMINE THAT Beam A IS BEST FOR UE A S104
PERFORM Random Access PROCEDURE USING RACH occasion CORRESPONDING TO Beam A
S105
S106 App SERVER ACQUIRES INFORMATION INDICATING THAT Beam A IS BEST FOR UE A (e.g., USING API)
AR IMAGE DATA ALIGNED BASED ON CORRECTION INFORMATION (DIRECTION AND DISTANCE) CORRESPONDING TO Beam A
S107
DISPLAY RECEIVED AR IMAGE DATA ON DISPLAY S108

20A
SSB Index #23
SSB Index #63
SSB Index #0
x
y
x-y
z
L
L'
L
α
β
h
REFERENCE POINT (Reference point) (e.g., CENTER OF STADIUM)
REFERENCE POINT (Reference point)

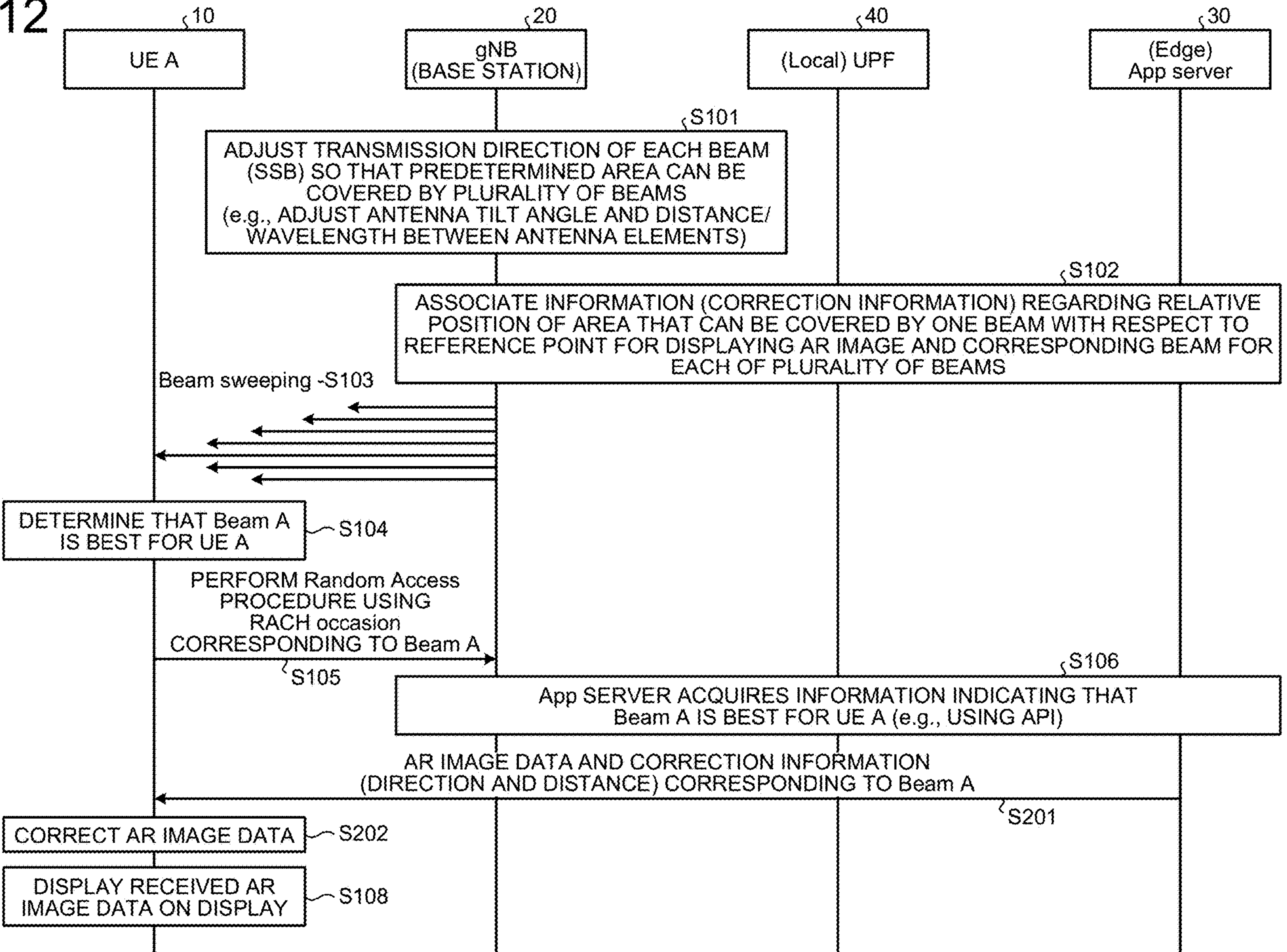
FIG.12
10
UE A
20
gNB (BASE STATION)
40
(Local) UPF
30
(Edge) App server
S101
ADJUST TRANSMISSION DIRECTION OF EACH BEAM (SSB) SO THAT PREDETERMINED AREA CAN BE COVERED BY PLURALITY OF BEAMS (e.g., ADJUST ANTENNA TILT ANGLE AND DISTANCE/ WAVELENGTH BETWEEN ANTENNA ELEMENTS)
S102
ASSOCIATE INFORMATION (CORRECTION INFORMATION) REGARDING RELATIVE POSITION OF AREA THAT CAN BE COVERED BY ONE BEAM WITH RESPECT TO REFERENCE POINT FOR DISPLAYING AR IMAGE AND CORRESPONDING BEAM FOR EACH OF PLURALITY OF BEAMS
Beam sweeping -S103
DETERMINE THAT Beam A IS BEST FOR UE A
S104
PERFORM Random Access PROCEDURE USING RACH occasion CORRESPONDING TO Beam A
S105
S106
App SERVER ACQUIRES INFORMATION INDICATING THAT Beam A IS BEST FOR UE A (e.g., USING API)
AR IMAGE DATA AND CORRECTION INFORMATION (DIRECTION AND DISTANCE) CORRESPONDING TO Beam A
S201
CORRECT AR IMAGE DATA
S202
DISPLAY RECEIVED AR IMAGE DATA ON DISPLAY
S108

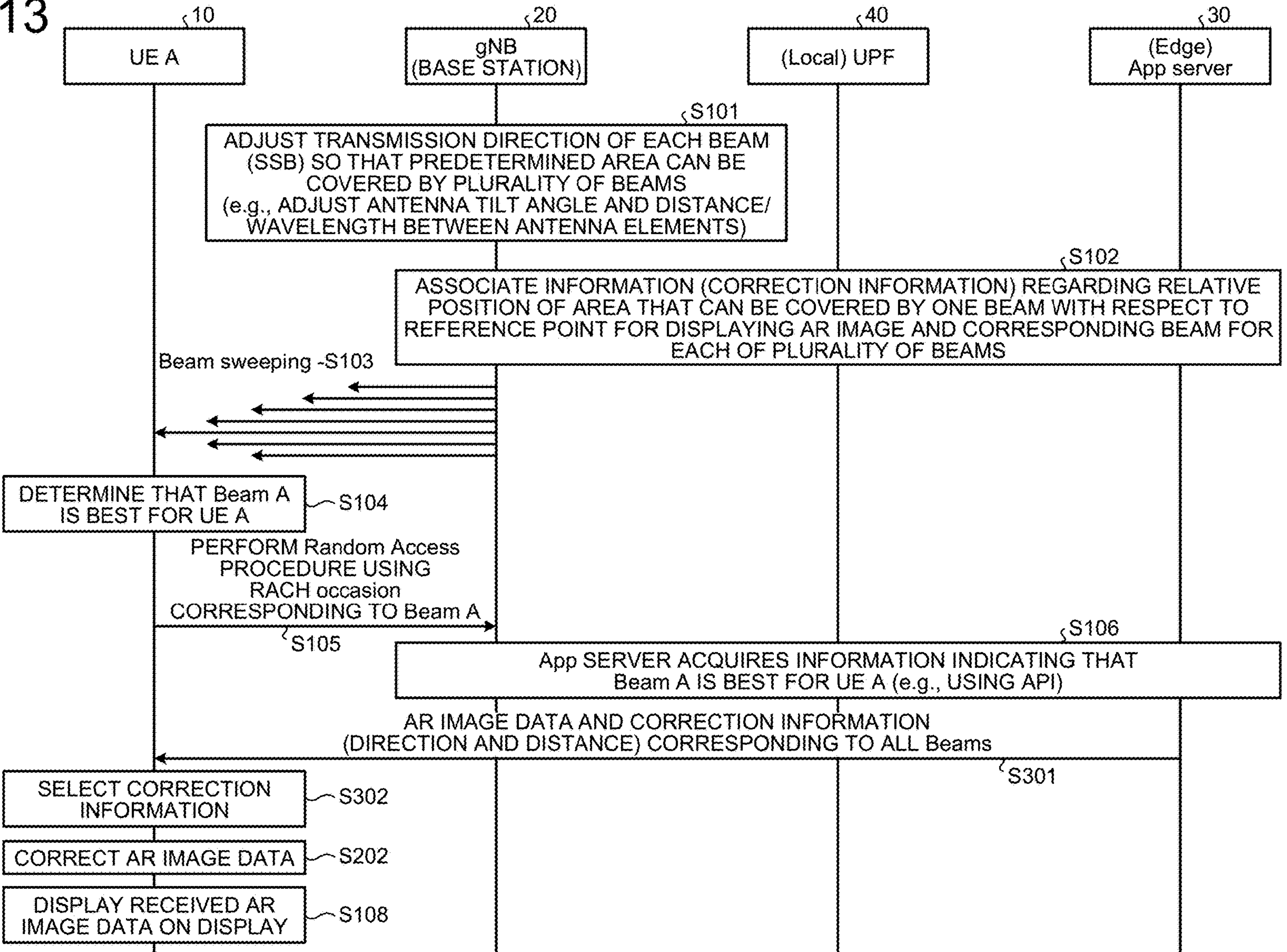
FIG. 13
10
UE A
20
gNB (BASE STATION)
40
(Local) UPF
30
(Edge) App server
S101
ADJUST TRANSMISSION DIRECTION OF EACH BEAM (SSB) SO THAT PREDETERMINED AREA CAN BE COVERED BY PLURALITY OF BEAMS (e.g., ADJUST ANTENNA TILT ANGLE AND DISTANCE/WAVELENGTH BETWEEN ANTENNA ELEMENTS)
S102
ASSOCIATE INFORMATION (CORRECTION INFORMATION) REGARDING RELATIVE POSITION OF AREA THAT CAN BE COVERED BY ONE BEAM WITH RESPECT TO REFERENCE POINT FOR DISPLAYING AR IMAGE AND CORRESPONDING BEAM FOR EACH OF PLURALITY OF BEAMS
Beam sweeping -S103
DETERMINE THAT Beam A IS BEST FOR UE A
S104
PERFORM Random Access PROCEDURE USING RACH occasion CORRESPONDING TO Beam A
S105
S106
App SERVER ACQUIRES INFORMATION INDICATING THAT Beam A IS BEST FOR UE A (e.g., USING API)
AR IMAGE DATA AND CORRECTION INFORMATION (DIRECTION AND DISTANCE) CORRESPONDING TO ALL Beams
S301
SELECT CORRECTION INFORMATION
S302
CORRECT AR IMAGE DATA
S202
DISPLAY RECEIVED AR IMAGE DATA ON DISPLAY
S108

FIG.15
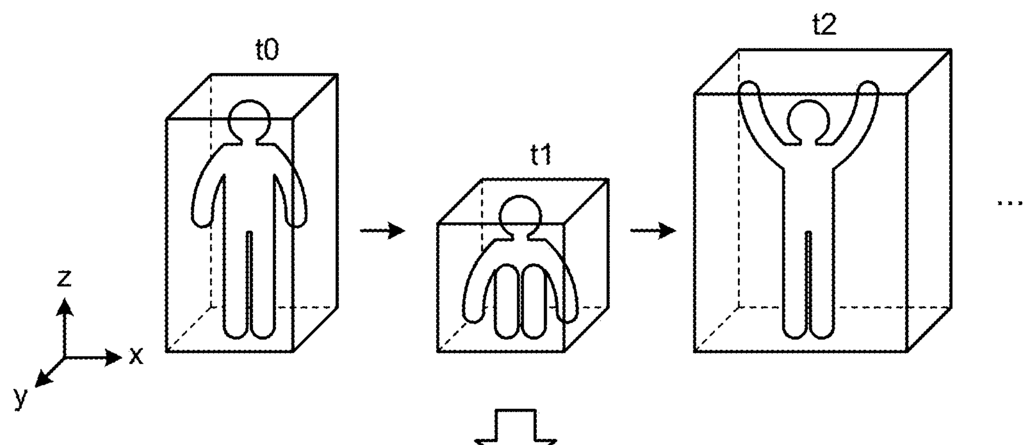
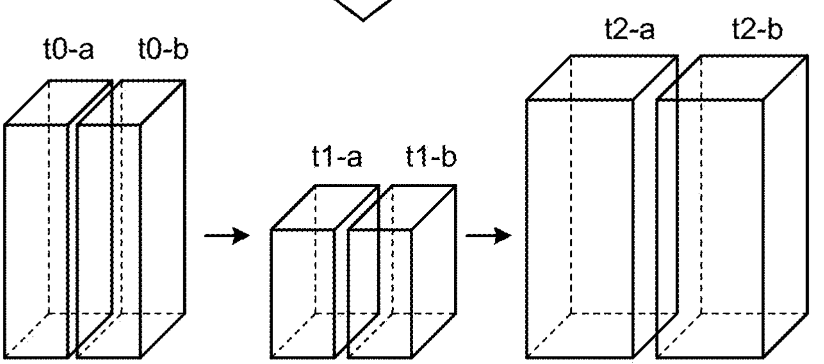
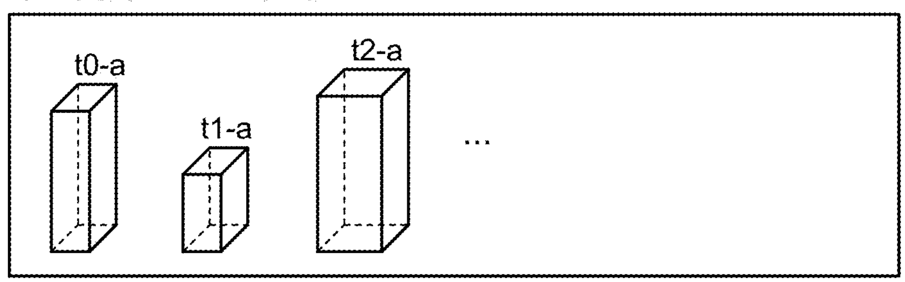
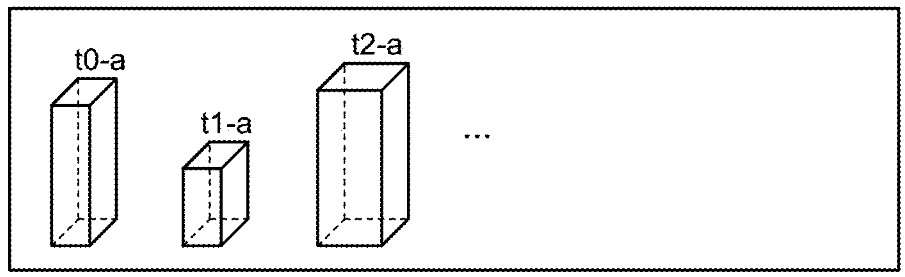

TERMINAL DEVICE, APPLICATION SERVER, RECEIVING METHOD, AND TRANSMITTING METHOD

CROSS-REFERENCE TO RELATED APPLICATIONS

The present application is a continuation of Ser. No. 17/764,983, filed Mar. 30, 2022, which is based on PCT filing PCT/JP2020/047059, filed Dec. 16, 2020, which claims priority to Japanese Patent Application No. 2019-232069, filed Dec. 23, 2019, the entire contents of each are incorporated herein by reference.

FIELD

The present disclosure relates to a terminal device, an application server, a receiving method, and a transmitting method.

BACKGROUND

Services using augmented reality (AR) and virtual reality (VR) are expected as killer contents for 5th generation mobile communication systems (5G New Radio (NR)). For example, in a case of the AR technology, a virtual content (hereinafter, also referred to as a "virtual object") in various forms such as text, icon, or animation can be superimposed on a real object captured in a real space image and presented to a user. Non Patent Literature 1 and Non Patent Literature 2 disclose use cases and (potential) requirements for services using AR and VR (for example, AR/VR games).

Regarding a technology of superimposing a virtual object on a real object, Non Patent Literature 3 and Patent Literature 1 disclose two methods, marker-based recognition and maker-less recognition. In a case of the marker-based recognition, a relative direction of a camera (imaging unit) with respect to a marker can be estimated according to the direction or pattern of the marker. In a case where the size of the marker is known, a distance between the marker and the camera (imaging unit) can also be estimated. In a case of the maker-less recognition (natural feature tracking), a relative location and direction with respect to a target object can be estimated according to prominent point features (interest point or key point) on the target object. Simultaneous localization and mapping (SLAM) is an example of the maker-less recognition technology. The SLAM is a technology of performing self-location estimation and environment map creation in parallel by using an imaging unit such as a camera, various sensors, an encoder, and the like. More specifically, a three-dimensional shape of an imaged subject is sequentially restored based on a moving image captured by the imaging unit. Then, by associating the restoration result with a result of detecting the position and posture of the imaging unit, a map of the surrounding environment is created and the position and posture of the imaging unit in the environment are estimated (recognized).

Furthermore, Non Patent Literature 3 and Patent Literature 1 also disclose a technology for improving accuracy in capturing and image recognition by combining various sensors (for example, a global positioning system (GPS), Wi-Fi, Bluetooth (registered trademark), wireless networking such as mobile networks, a magnetometer (for example, electronic compass), a gyroscope, and a linear accelerometer) and the like for imaging using a camera.

CITATION LIST

Non Patent Literature

Non Patent Literature 1: 3GPP TR 22.842, V17.1.0 (September 2019) 3rd Generation Partnership Project; Technical Specification Group Services and System Aspects; Study on Network Controlled Interactive Services (Release 17)

Non Patent Literature 2: 3GPP TS 22.261 v17.0.1 (October 2019) 3rd Generation Partnership Project; Technical Specification Group Services and System Aspects; Service requirements for next generation new services and markets (Release 17)

Non Patent Literature 3: Dieter Schmalstieg et al., "AR Textbook", Mynavi Publishing Corporation, published on Jul. 30, 2018.

Patent Literature

Patent Literature 1: WO 2017/183346 A

SUMMARY

Technical Problem

Services using AR/VR are being considered for provision in a large-scale facility such as a stadium and a concert hall. For example, an AR event such as an AR sport tournament or an AR game tournament may be held at the stadium, and a spectator may view (watch) the AR event via an AR device (a smartphone, an AR head-mounted display (ARHMD), or the like).

In a large-scale facility such as a stadium, it is desirable that user experiences are commonized in such a way that all spectators view (watch) the same object in real time in order to improve the user experience by creating a sense of unity among the spectators.

In such a case, the spectators view (watch) the same object (a real object and a virtual object) from different locations (seats). Since the spectators are at different locations (seats) from each other, even in a case where the same object (the real object and the virtual object) is viewed (watched), the directions (viewing directions) of the objects (the real object and the virtual object) that each spectator can visually recognize is respectively different. Therefore, in order to provide an appropriate AR image to the spectators at different locations, a technology for appropriately superimposing a virtual object on an object (real object) in the real world is required. This technology includes capturing, image recognition, and rendering and outputting/emitting. Among them, the capturing and the image recognition may include processing such as alignment, calibration, or tracking.

However, in a large-scale facility (for example, a stadium or a concert hall) assumed as a place where a service using AR is provided, the capturing and the image recognition using the above-described prior art may be insufficient.

For example, in a large space such as a stadium, it is assumed that a distance from a spectator stand to a target object (for example, a marker or interest point) that serves as a reference for alignment is long. Further, from the viewpoint of reducing a wearing load of the spectator, it is desirable that a terminal (AR device) is lightweight and compact. In this case, performance of a camera that can be mounted on the AR device (for example, a lens size and a sensor size) and an allowable processing load on the device (for example, processor processing capacity or battery capacity) may be limited. Therefore, in an AR device with limited camera performance and allowable processing load, there is a possibility that the capturing and the image recognition using a reference object (a target object serving as a reference for the capturing and the image recognition, for example, a marker or interest point) for alignment arranged at a location far from spectator stands cannot be appropriately performed.

Therefore, the present disclosure provides a terminal device, an application server, a receiving method, and a transmitting method that contribute to improving accuracy in capturing and image recognition when viewing an AR service using 5G from spectator stands in a large-scale facility such as a stadium.

It should be noted that the above-mentioned problem or purpose is only one of a plurality of problems or purposes that can be solved or achieved by a plurality of embodiments disclosed in the present specification.

Solution to Problem

According to the present disclosure, a terminal device is provided. The terminal device includes a transceiver, a camera for imaging a real object, a display for displaying an augmented reality image in which a virtual object is superimposed on the real object imaged by the camera, and a processor.

The processor is configured to receive, via the transceiver, at least one of a plurality of synchronization signals beamformed in directions different from each other and transmitted from a base station. The processor is configured to determine a first synchronization signal whose radio quality satisfies a predetermined threshold from the at least one of the received synchronization signals. The processor is configured to transmit a random access preamble by using a random access occasion corresponding to the first synchronization signal in order to report the first synchronization signal to the base station. The processor is configured to receive information regarding the augmented reality image from an application server after a random access processing procedure including the transmission of the random access preamble is completed.

The information regarding the augmented reality image is correction information used for displaying the augmented reality image, or augmented reality image data in which the virtual object is aligned with respect to the real object based on the correction information. In a case where the information regarding the augmented reality image is the correction information, the processor aligns the virtual object with respect to the real object by using the correction information, generates the augmented reality image, and outputs the augmented reality image to the display. In a case where the information regarding the augmented reality image is the augmented reality image data in which the virtual object is aligned with respect to the real object based on the correction information, the processor outputs the augmented reality image to the display based on the received augmented reality image data.

The correction information is information for indicating a position of an area, covered by the beamformed and transmitted first synchronization signal, with respect to the real object. The correction information includes information regarding a direction of the virtual object to be displayed on the display in the area and a distance from the real object to the area.

BRIEF DESCRIPTION OF DRAWINGS

FIG. 8 is a sequence diagram illustrating an operation example of the communication system according to the first embodiment of the present disclosure.

FIG. 12 is a sequence diagram illustrating an operation example of the communication system according to a first modified example of the first embodiment of the present disclosure.

FIG. 13 is a sequence diagram illustrating an operation example of the communication system according to a second modified example of the first embodiment of the present disclosure.

FIG. 15 is a diagram for describing a spatial division method and spatial position information according to a second embodiment of the present disclosure.

DESCRIPTION OF EMBODIMENTS

Figure 1:
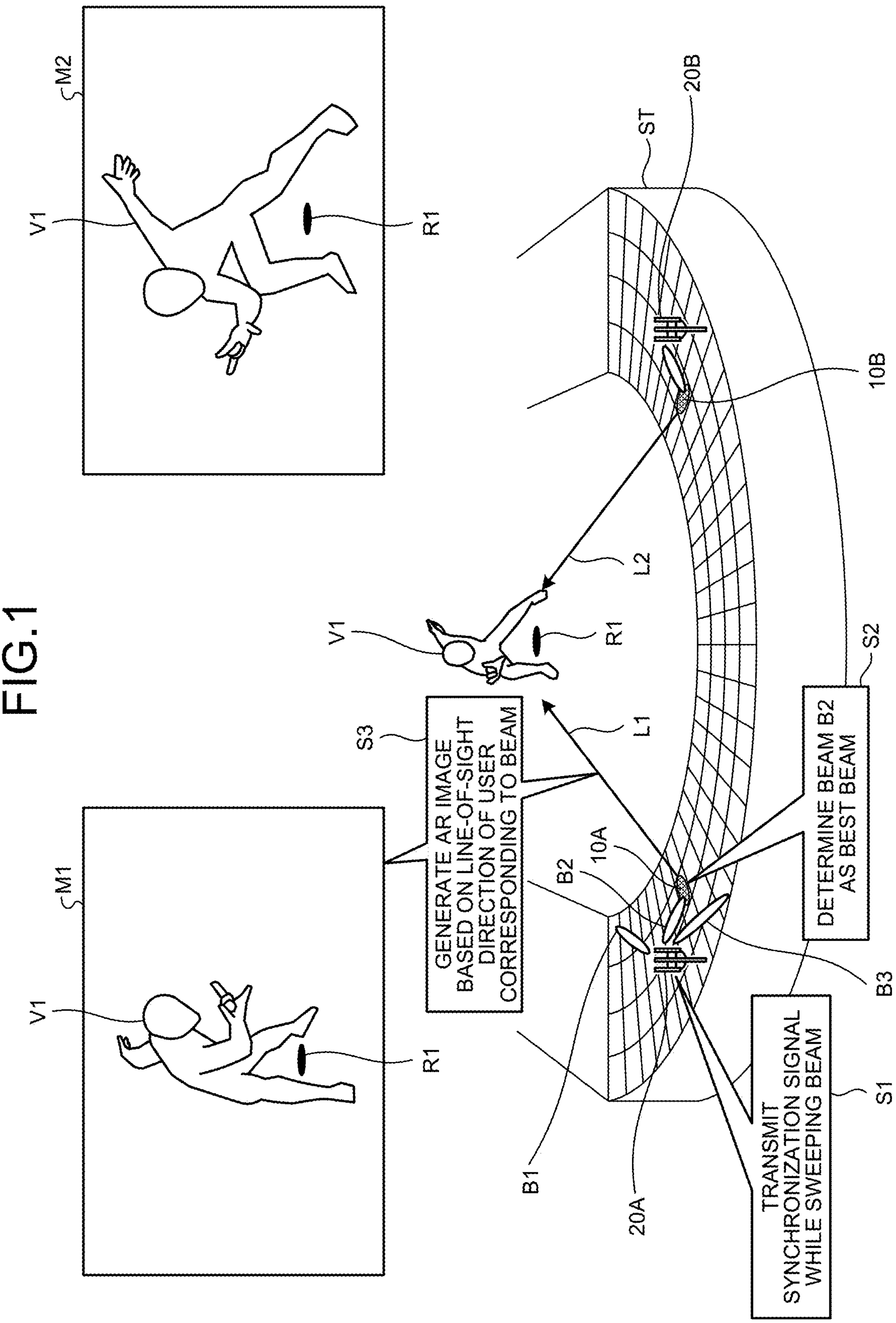
FIG. 1 is a diagram for describing an example of information processing according to a first embodiment of the present disclosure.

Hereinafter, exemplary embodiments of the present disclosure will be described in detail with reference to the appended drawings. Note that, in the present specification and the drawings, components having substantially the same functional configuration are provided with the same reference signs, so that an overlapping description of these components is omitted.

In the present specification and the drawings, components having substantially the same functional configuration may be distinguished by adding different alphabets or numerals after the same reference signs. For example, a plurality of components having substantially the same functional configuration are distinguished as necessary, such as UEs 10A and 10B. However, in a case where it is not particularly necessary to distinguish each of the plurality of components having substantially the same functional configuration, only the same reference sign is given. For example, in a case where it is not necessary to distinguish between the UEs 10A and 10B, it is simply referred to as a UE 10.

Each of the plurality of embodiments (including examples) described below can be implemented independently. On the other hand, at least some of the plurality of embodiments described below may be implemented in combination with at least some of other embodiments as appropriate. These plurality of embodiments may include novel characteristics different from each other. Therefore, these plurality of embodiments can contribute to achieve or solving different purposes or problems, and can exert different effects.

Some of the plurality of exemplary embodiments described below are described with 5G New Radio (NR) as a main target. However, these embodiments are not limited to 5G NR, and may be applied to other mobile communication networks or systems such as 3GPP long term evolution (LTE) (including LTE-Advanced and LTE-Advanced Pro), a 3GPP universal mobile telecommunications system (UMTS), and the like.

The NR is the next generation (5th generation) radio access technology (RAT) following the LTE. The NR is a radio access technology that can support various use cases including enhanced mobile broadband (eMBB), massive Internet of Things (mIoT) (or massive machine type communications (mMTC)), and ultra-reliable and low latency communications (URLLC). The NR has been studied for a technical framework that addresses usage scenarios, requirements, arrangement scenarios, and the like in those use cases. In addition, the NR includes new radio access technology (NRAT) and Further EUTRA (FEUTRA).

Note that the description will be provided in the following order.

1. First Embodiment
1.1. Outline of Information Processing According to First Embodiment of Present Disclosure
1.2. Overview of Radio Communication between Base Station and UE
1.3. Example of Configuration of Communication System
1.3.1. Example of Overall Configuration of Communication System
1.3.2. Example of Configuration of Terminal Device
1.3.3. Example of Configuration of Base Station
1.3.4. Example of Configuration of Application Server
1.4. Operation of Communication System
1.5. Modified Examples
1.5.1. First Modified Example
1.5.2. Second Modified Example
2. Second Embodiment
3. Third Embodiment
4. Fourth Embodiment
5. Other Embodiments
6. Supplementary Description

1. First Embodiment

1.1. Outline of Information Processing According to First Embodiment of Present Disclosure FIG. 1 is a diagram for describing an example of information processing according to a first embodiment of the present disclosure. The information processing according to the first embodiment is performed by a communication system including a user equipment (UE) 10 possessed by a user in a spectator stand in a large-scale facility such as a stadium ST, a base station 20 that performs communication with the UE 10, and an application server 30 (not illustrated) that generates augmented reality (AR) image data to be presented to a user, but is not limited thereto.

In the information processing according to the first embodiment, the base station 20 transmits the augmented reality image data generated by the application server 30 to the UE 10, and processing of displaying the augmented reality image data on a display of the UE 10 is performed. Hereinafter, an augmented reality image may be referred to as an AR image. The UE 10 is, for example, AR glasses which are a kind of AR head-mounted display (ARHMD), and presents the AR image to a user who wears the AR glasses in a spectator stand in the stadium ST. In the AR image, a virtual object V1 (AR image data) is superimposed on a real object R1 on the ground in the stadium ST. By viewing the AR image, the user can watch an AR event held at the stadium ST, such as AR sports and AR game competitions, and participate in the AR event. The real object R1 can be a moving object such as a ball or a person on the ground, or a marker provided on the ground.

Here, the stadium ST is a large-scale facility, and a plurality of users view the same virtual object V1 from spectator stands surrounding the ground. Therefore, each user views the same object (the real object R1 and the virtual object V1) from a different location, but a direction in which the object is viewed (viewing direction) is different for each user. For example, in the example of FIG. 1, a user possessing a UE 10A views the virtual object V1 from the front-left side. That is, a viewing direction L1 of the user possessing the UE 10A is a direction from the front-left side of the virtual object V1 toward the virtual object V1. On the other hand, a user possessing a UE 10B views the virtual object V1 from the front-right side. That is, a viewing direction L2 of the user possessing the UE 10B is a direction from the front-right side of the virtual object V1 toward the virtual object V1.

When the application server 30 generates the same AR image data for each UE 10, there is a possibility that the UEs 10A and 10B present the AR images including the virtual object V1 (AR image data) viewed from the same direction even though the viewing directions L1 and L2 are different, which may give the users a sense of discomfort.

Therefore, in order to generate the AR image data according to the viewing directions L1 and L2 of the users so as not to give the users a sense of discomfort, it is necessary to correct the virtual object (AR image data) based on the viewing direction for each user, that is, each UE 10, and superimpose the corrected virtual object on the real space.

Here, in conventional methods such as marker-based recognition and marker-less recognition, the viewing direction of the user is detected by detecting a marker or an interest point with a camera mounted on AR glasses (corresponding to the UE 10 of the present embodiment). However, in a large-scale facility such as the stadium ST, the size of the marker or interest point may be small, which makes detection using the AR glasses difficult. Furthermore, considering the long-term viewing of the AR image data by the user, the lightness of the AR glasses (corresponding to the UE 10 of the present embodiment) can be one of the important factors, and it may be difficult to mount a camera that enables high-quality imaging.

Therefore, in the information processing according to the present embodiment, a location to which each of a plurality of beams formed by the base station 20 is delivered is associated in advance with correction information generated for each UE 10 to appropriately superimpose the AR image data generated in a case where the AR image data is viewed from the location. As a result, the AR image data corrected according to the location of the UE 10 (hereinafter, also referred to as corrected AR image data) is presented to the user.

Specifically, in Step S1, a base station 20A transmits synchronization signals to the UE 10 while sweeping the beams. For example, in FIG. 1, the base station 20A transmits a plurality of beams B1 to B3 in different directions. Note that the number of beams transmitted by the base station 20A is not limited to three, and may be two or four or more.

In Step S2, the UE 10A determines a synchronization signal whose radio quality (for example, reception level) satisfies a predetermined threshold from the synchronization signals received from the base station 20A, and determines, as the best beam, a beam that has transmitted the determined synchronization signal. The UE 10A reports information regarding the determined best beam to the base station 20A. The reported information regarding the best beam is provided to the application server 30 via the base station 20A or the like.

The application server 30 generates the corrected AR image data corresponding to the best beam determined by the UE 10A. The corrected AR image data is associated in advance so that when the user views the AR image data from the viewing direction L1, the virtual object V1 is superimposed on the real object R1 in an appropriate direction. For example, the application server 30 generates the corrected AR image data by correcting the AR image data based on the correction information corresponding to the best beam, and transmits the corrected AR image data to the UE 10A via the base station 20A.

In Step S3, the UE 10A generates an AR image M1 based on a line-of-sight direction of the user that corresponds to the best beam by superimposing the corrected AR image data on a captured image (real object) of a camera mounted on the UE 10A, for example. In the example of FIG. 1, the UE 10A displays, as the AR image M1, an image of the virtual object V1 viewed from the viewing direction L1 on the display.

Similarly, the UE 10B determines the best beam from a plurality of beams transmitted by the base station 20B, and the application server 30 generates the corrected AR image data based on the correction information corresponding to the best beam. The UE 10B displays an AR image M2 (an image of the virtual object V1 viewed from the viewing direction L2) on the display by superimposing the virtual object V1 of the corrected AR image data on the real object, as illustrated in FIG. 1.

By associating the beam transmitted by the base station 20 with the correction information in this way, it is possible to provide the corrected AR image data according to the location of the UE 10. Therefore, it is possible to contribute to improving the accuracy in capturing and image recognition when viewing an AR service from spectator stands in a large-scale facility such as the stadium ST.

Hereinafter, the details of the communication system that performs the above-described information processing will be described with reference to the drawings.

1.2. Overview of Radio Communication Between Base Station and UE

The UE 10 and the base station 20 described above perform radio communication based on, for example, 5G NR. Beamforming performed by 5G NR, especially the base station 20, will be described below.

5G NR allows communication in a high frequency band (for example, a band of 6 GHz or higher) compared to LTE of the 4th generation cellular communication system. In the high frequency band, beamforming is used to cover the characteristics (straightness and attenuation) of radio waves (i.e., to compensate for propagation loss). Thereby, the propagation loss can be compensated by the beam gain. However, beamforming allows radio waves to travel far, even in the high frequency band, while narrowing the beam and narrowing a physical range covered by a single beam. Therefore, 3GPP 5G NR introduces beam sweeping. Beamforming is a technology for sequentially broadcasting a plurality of synchronization signals beamformed in different directions from the base station 20 (see FIG. 4). Therefore, it is possible to cover an area that could be covered without beamforming (i.e., with an omnidirectional beam) in a low frequency band even in the high frequency band. As for a signal subjected to beam sweeping, at least a synchronization signal (SS/physical broadcast channel (PBCH) block) and a channel state information reference signal (CSI-RS) are specified in a downlink direction.

The beam sweeping of the synchronization signal (SS/PBCH block) will be described more specifically. In 3GPP Rel.15, the synchronization signal for downlink synchronization of the terminal device (UE) 10 with the network is called a synchronization signal block (SSB) (SS/PBCH block). The synchronization signal (SS) includes a primary synchronization signal (PSS) and a secondary synchronization signal (SSS). The physical broadcast channel (PBCH) carries a master information block. One SSB includes the PSS, the SSS, and the PBCH. The SSB is periodically transmitted from the base station 20 (radio access network (RAN)) into a cell as an SSB burst (SS burst) including a plurality of SSBs. An SSB index as an identifier is added to each of the plurality of SSBs in one SSB burst. In 3GPP Rel.15, the number of SSBs in one SSB burst is either 4, 8, or 64 according to a frequency range. The SSB is beamformed and transmitted in different directions. The terminal device 10 reports, to the base station 20, a beam of a direction whose reception quality is favorable in a random access channel (RACH) occasion associated with the SSB index.

The frequency band and the number of beams (the number of SSBs) per unit time (e.g., one SS burst or one SSB burst) are defined in association with each other. In 3GPP, the maximum number of beams (the number of SSBs) per unit time (e.g., one SS burst or one SSB burst) is defined as Lmax. For example, a band with a carrier frequency of 6 GHz or less corresponds to a frequency range FR 1. A band with a carrier frequency of 6 GHz or higher corresponds to a frequency range FR2.

Figure 2:
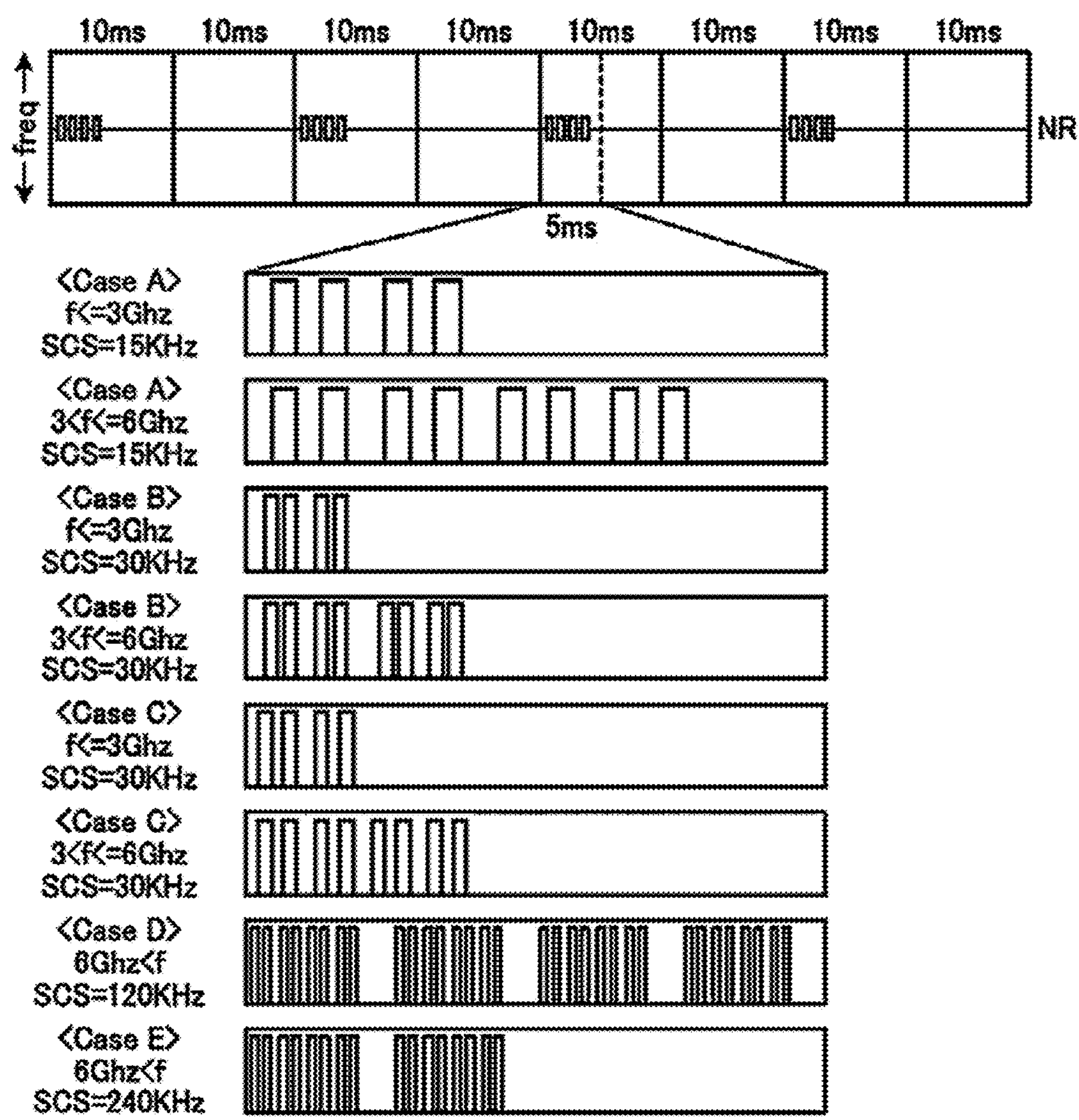
FIG. 2 is a diagram illustrating a conventional transmission pattern of a synchronization signal block (SSB).

FIG. 2 is a diagram illustrating a transmission pattern of a conventional SSB. Cases A to E are transmission patterns of the conventional SSB. For FR1 (i.e., Cases A to C), the number of transmitted SSBs is four or eight per unit time (half frame: 5 ms or one SSB burst). For FR2 (i.e., Cases D and F), the number of transmitted SSBs is 64 per unit time (half frame: 5 ms or one SSB burst). In other words, since FR2 is a frequency range of 24250 MHz to 52600 MHz, Lmax=64 is defined as the number of SSBs that can be supported even in this frequency band.

In other words, in a case of FR2 (a band of 6 GHz or higher), a maximum of 64 (64 types of) beamformed SSBs are required, which is more than that in a case of FR1. In other words, in a case of FR1 (Cases A to C), the maximum number of SSBs transmitted per unit time (half frame: 5 ms) is four or eight. Therefore, in a case of FR1, it is sufficient to perform beam sweeping with a maximum of four or eight beams (beamformed SSBs). However, in a case of FR2 (Cases D and F), the maximum number of SSBs transmitted per unit time (half frame: 5 ms) is 64. Therefore, in a case of FR2, it is necessary to perform beam sweeping with a maximum of 64 beams (beamformed SSBs). This is because in the high frequency band (for example, a band of 6 GHz or higher), the propagation loss becomes larger than that in the low frequency band, and it is necessary to narrow down the beam.

In the future, a frequency band higher than 52600 MHz (for example, a band of 100 GHz) and a frequency range (for example, FR3) may be newly defined by expansion. In this case, 64 may not be enough for the maximum number of SSBs (Lmax) in one SSB burst to cover the same geographical area because it is necessary to further narrow the beam. For example, in the band of 100 GHz, Lmax=64 is not sufficient, and Lmax may be larger than 64, for example 128 or 256. Some embodiments, including the present embodiment, are also applicable to a frequency range (e.g., FR3) and Lmax of 64 or more that may be defined in the future.

As can be understood from the characteristics of the synchronization signal (SSB) in 5G NR described above, the SSB (i.e., beam) preferable for the terminal device (UE) 10 (i.e., radio quality is equal to or higher than the predetermined threshold) varies depending on the location of the terminal device (UE) 10. Which SSB (i.e., beam) is preferable for the terminal device (UE) 10 can be determined based on 5 ms+several ms (e.g., one SS burst+processing time in the terminal). Therefore, in the present embodiment, the SSB index is associated with the correction information (direction and distance) applied to the virtual object in the AR/VR image.

As described above, 3GPP TR 22.842 v17.1.0 and TS 22.261 v17.0.1 specify the requirements for rendering a game image for a cloud game using AR/VR. More specifically, these technical specifications and reports describe motion-to-photon latency and motion-to-sound latency as allowable latencies at a level that allows an AR/VR user to feel comfortable with a motion in a video in rendering a game image, as follows.

- Motion-to-photon latency: The motion-to-photon latency is in a range of 7 to 15 ms while maintaining a required data rate (1 Gbps).
- Motion-to-sound latency: less than 20 ms.

Note that the motion-to-photon latency can be defined as latency between a physical motion of the user's head and an updated image in an AR/VR headset (e.g., head-mounted display). Also, the motion-to-sound latency can be defined as latency between the physical motion of the user's head and updated sound waves that reach the user's ears from a head-mounted speaker. The AR/VR headset (head-mounted display) and the head-mounted speaker here may be the terminal device 10 in the present embodiment.

The above technical specifications and reports specify that a 5G system needs to satisfy the following two requirements for rendering in order to satisfy these latency conditions.

- Max Allowed End-to-end latency: 5 ms (that is, (e.g., a total allowable latency in uplink and downlink between the terminal device (UE) 10 in the present embodiment and an interface for a data network (e.g., a network deployed ahead of a core network when viewed from the UE, including a cloud network or edge network) is 5 ms).
- Service bit rate: user-experienced data rate: 0.1 Gbps (100 Mbps) (that is, a throughput that can support an AR/VR content).

Note that the rendering here includes cloud rendering, edge rendering, or split rendering. In the cloud rendering, AR/VR data is rendered on a cloud of the network (on an entity that is based on core network (including the user plane function (UPF)) deployment that does not consider the location of the user and data network (including the application server and application function (AF)) deployment). In the edge rendering, AR/VR data is rendered on an edge of the network (on an entity (e.g. an edge computing server (the application server 30 in the data network in network deployment for edge computing) that is based on core network (including the UPF) deployment and data network (including the application server and AF) deployment close to the location of the user). The split rendering means rendering in which a part of the rendering is performed on the cloud and the other part is performed on the edge.

Figure 3:
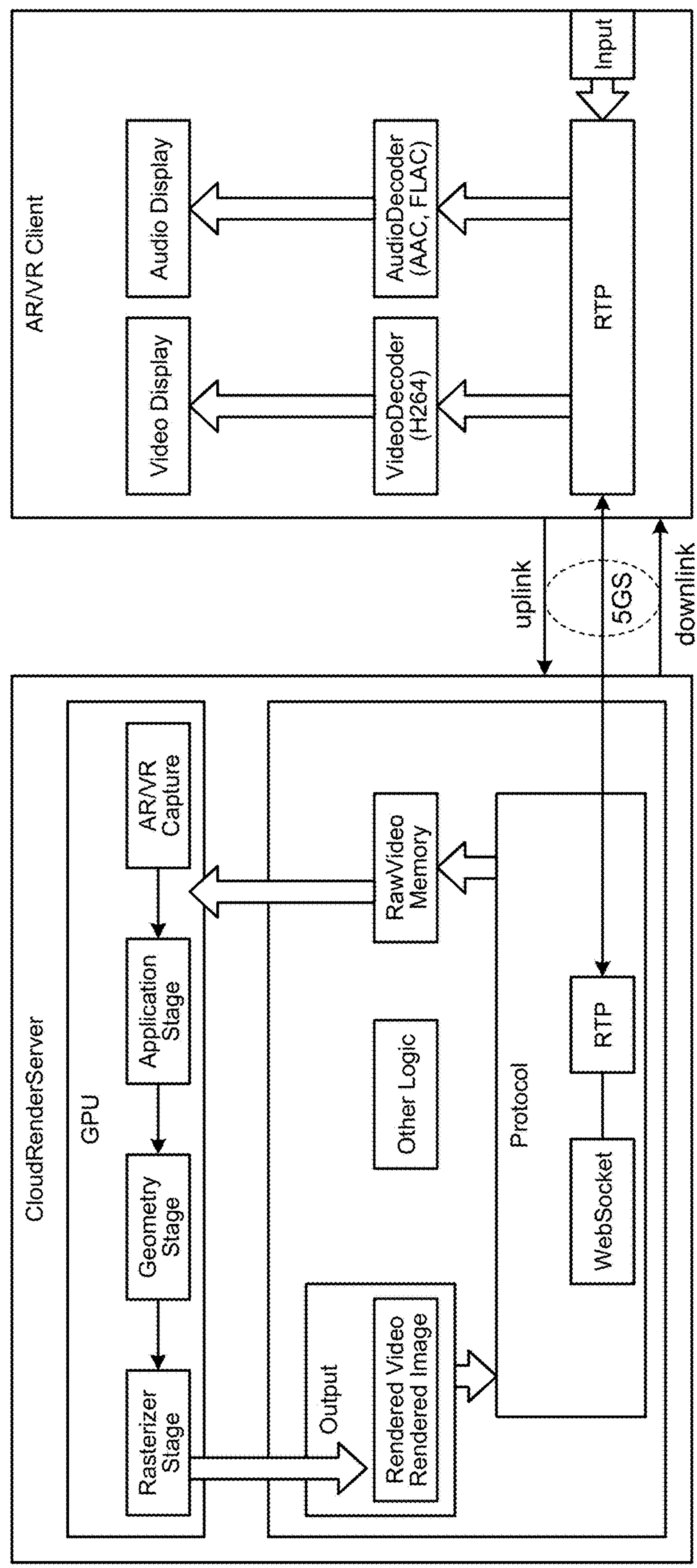
FIG. 3 is a diagram of a rendering server and an AR/VR client related to rendering.

FIG. 3 is a diagram illustrating images of a rendering server and an AR/VR client related to rendering. Note that the rendering server and the AR/VR client are described in the above technical report. Here, the AR/VR client may correspond to the terminal device (UE) 10 in the present embodiment. Further, a cloud render server may be an application server arranged on the cloud, or an application server (e.g., edge computing server) arranged on the edge for edge computing. Further, the cloud render server may be referred to as an edge render server or a split render server. The rendering server may correspond to the application server 30 in the present embodiment.

1.3. Example of Configuration of Communication System

1.3.1. Example of Overall Configuration of Communication System

Figure 4:
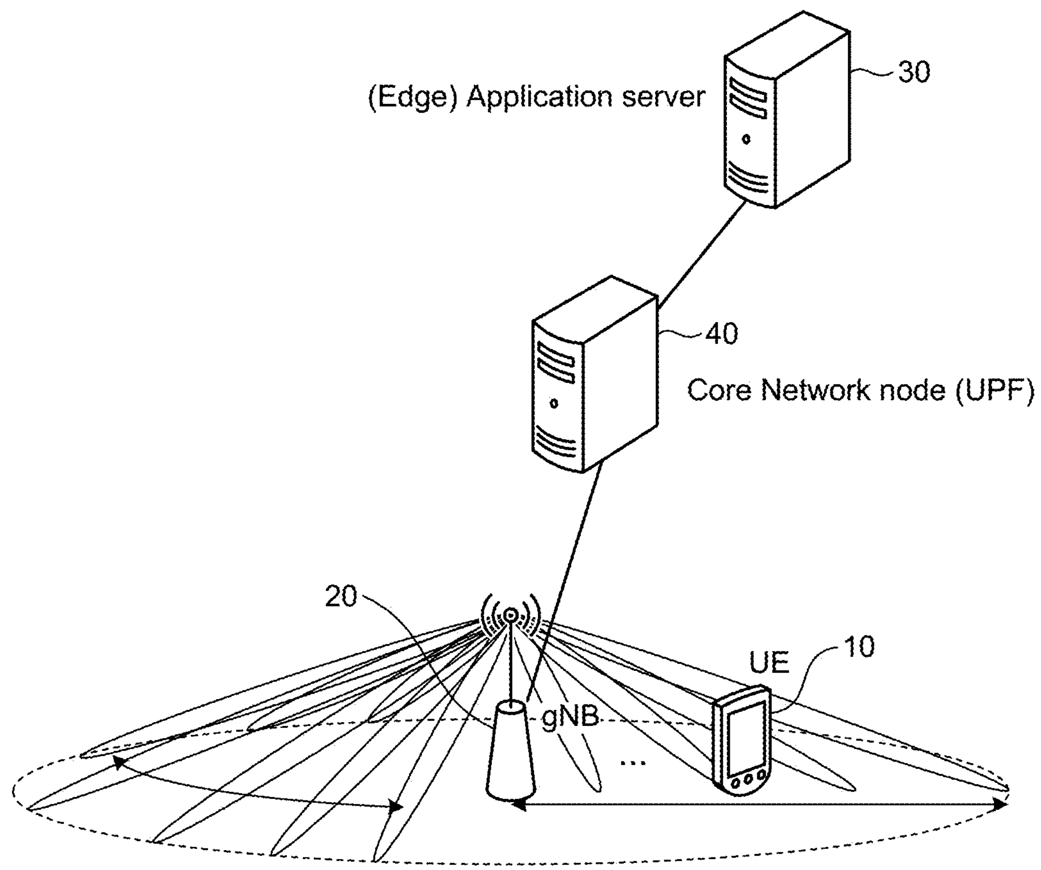
FIG. 4 is a diagram illustrating an example of a logical configuration of a communication system according to the first embodiment of the present disclosure.

FIG. 4 is a diagram illustrating an example of a logical configuration of the communication system according to the first embodiment of the present disclosure. The communication system of FIG. 4 includes the terminal device (UE) 10, the base station (gNB) 20, a core network node (e.g., UPF) 40, and the application server (e.g., (edge) application server) 30.

(Terminal Device)

The terminal device 10 may be connected to the base station 20 via a Uu interface. More specifically, the terminal device (UE) 10 performs a cell search/cell selection procedure, camps on a certain cell as a suitable cell, and then performs a random access procedure at an arbitrary timing. From the viewpoint of the terminal, the random access procedure includes transmission of a random access preamble, reception of a random access response, and subsequent reception of Message 3 (Msg3). After the random access procedure succeeds, a radio resource control (RRC) setup procedure is performed with the base station (gNB) 20, and the terminal device 10 enters RRC Connected in response to reception of an RRC setup message. Then, the terminal device 10 considers a current cell (serving cell) in which the RRC setup procedure is performed as a primary cell (PCell).

(Base Station)

As described above, the base station 20 performs communication with the terminal device 10 via the Uu interface. Note that the single base station 20 may manage a plurality of cells or a plurality of BWPs. One or more base stations 20 constitute a radio access network (RAN). Here, the radio access network may be an evolved universal terrestrial radio access network (E-UTRAN) or a next generation radio access network (NG-RAN). Further, the base station 20 may be referred to as any one or a combination of a gNB central unit (CU) and a gNB distributed unit (DU). In the present embodiment, the base station 20 may be configured to be capable of performing radio communication with another base station. For example, in a case where a plurality of base stations 20 are eNBs or a combination of eNB(s) and gNB(s), the devices may be connected by an X2 interface. Further, in a case where a plurality of base stations 20 are eNBs or a combination of eNB(s) and gNB(s), the devices may be connected by an Xn interface. Further, in a case where a plurality of base stations 20 are a combination of gNB CU(s) and gNB DU(s), the devices may be connected by an F1 interface. All or at least some of the messages/information to be described later may be communicated between a plurality of base stations 20 (for example, via the X2, Xn, or F1 interface).

Further, the base station 20 may include a set of a plurality of physical or logical devices. For example, in the present embodiment, the base station 20 is classified into a plurality of devices including a baseband unit (BBU) and a radio unit (RU), and may be interpreted as a set of these plurality of devices. In addition or instead, in the embodiments of the present disclosure, the base station 20 may be either or both of the BBU and the RU. The BBU and the RU may be connected by a predetermined interface (for example, eCPRI). In addition or instead, the RU may be referred to as a remote radio unit (RRU) or a Radio DoT (RD). In addition or instead, the RU may correspond to the gNB DU described above or below. In addition or instead, the BBU may correspond to the gNB CU described above or below. In addition or instead, the RU may be a device integrally formed with an antenna. An antenna of the base station 20 (for example, the antenna integrally formed with the RU) may adopt an advanced antenna system and support MIMO (for example, FD-MIMO) or beamforming. In the advanced antenna system, the antenna of the base station 20 (for example, the antenna integrally formed with the RU) may include, for example, 64 transmission antenna ports and 64 reception antenna ports. In a case where the base station 20 supports beamforming, the base station 20 transmits a signal by, for example, performing beam sweeping of the beam in a circumferential direction or a radial direction of a cell, as illustrated in FIG. 4. Note that the direction of the beam sweeping is not limited to a horizontal direction, and may be a vertical direction or an arbitrary direction corresponding to a combination of the horizontal direction and the vertical direction. That is, in a case where a plurality of antenna elements of an antenna that performs beamforming are arranged in the horizontal direction and the vertical direction with respect to an antenna surface, configuration related to the antenna to be described later (e.g., an antenna tilt angle, a distance/wavelength between the antenna elements, a phase offset, and reference transmit power) can be adjusted to perform a directivity control of the beam in the horizontal direction and the vertical direction.

(Core Network Node)

The core network node 40 is connected to the base station 20 via a network interface. The core network is formed by a plurality of core network nodes 40. The core network may be 5GC. That is, the core network node 40 may be any one of an access and mobility management function (AMF), a UPF, a session management function (SMF), a network exposure function (NEF), an AF, and the like. In FIG. 4, only one core network node 40 is illustrated, but the number of core network nodes 40 is not limited thereto. The number of core network nodes 40 that can perform communication with the base station 20 (e.g., gNB) (i.e., having a reference point with the base station (gNB) 20) may be plural. Similarly, the number of core network nodes 40 that can perform communication with the application server 30 (i.e., having a reference point with the application server 30) may be plural. For example, in a case where the core network node 40 is a UPF as illustrated in FIG. 4, the UPF is connected to the base station gNB via an NG-U interface. In the NG-U interface, an NG-application protocol (NG-AP) message can be communicated. All or at least some of the messages/information to be described later may be communicated between the base station 20 and the core network node 40 (for example, via the NG-C interface or the NG-U interface). Also, from the viewpoint of a control plane, the core network node (e.g., AMF) 40 can perform NAS signaling with the terminal device 10. That is, all or at least some of the messages/information to be described later may be communicated between the terminal device 10 and the core network node 40 by NAS signaling. As will be described later, in a case where the application server 30 in the present embodiment is an edge application server in an edge data network, the core network node 40 may be a local UPF.

(Application Server)

The application server ((edge) application server) 30 hosts an application provided to the terminal device 10 and data thereof, and provides application data (e.g., AR image data) in response to a request from the terminal device 10. The application data is provided to the terminal device 10 via the core network and the base station 20.

In a case where the core network node 40 described above is a node (e.g., UPF) in charge of the user plane function, the application server 30 is directly or indirectly connected to the core network node 40. More specifically, the UPF is operated as a gateway for the data network, communication with a server (e.g., application server 30) within the data network is enabled. In a case where the core network node 40 is a node (e.g., AMF or SMF) in charge of the control plane function, the application server 30 is directly or indirectly connected to the core network node 40. More specifically, the application server (e.g., application function in a server) 30 can perform communication (e.g., information exchange using an application programming interface (API) or the like) with a C-plane node of 5GC directly or indirectly via the network exposure function (NEF).

Note that the edge computing may be applied to the present embodiment. The edge computing allows services of an operator and a third party to be hosted near an access point of the UE 10. Therefore, end-to-end latency and a load on a transport network can be reduced, and efficient service delivery can be realized. That is, the data network may be an edge data network. The application server 30 may be an edge application server in the edge data network. The edge computing here may be referred to as multi-access edge computing (MEC) or mobile edge computing (MEC). Details of an example of application of the present embodiment to the edge computing will be described later in a third embodiment.

1.3.2. Example of Configuration of Terminal Device

Figure 5:
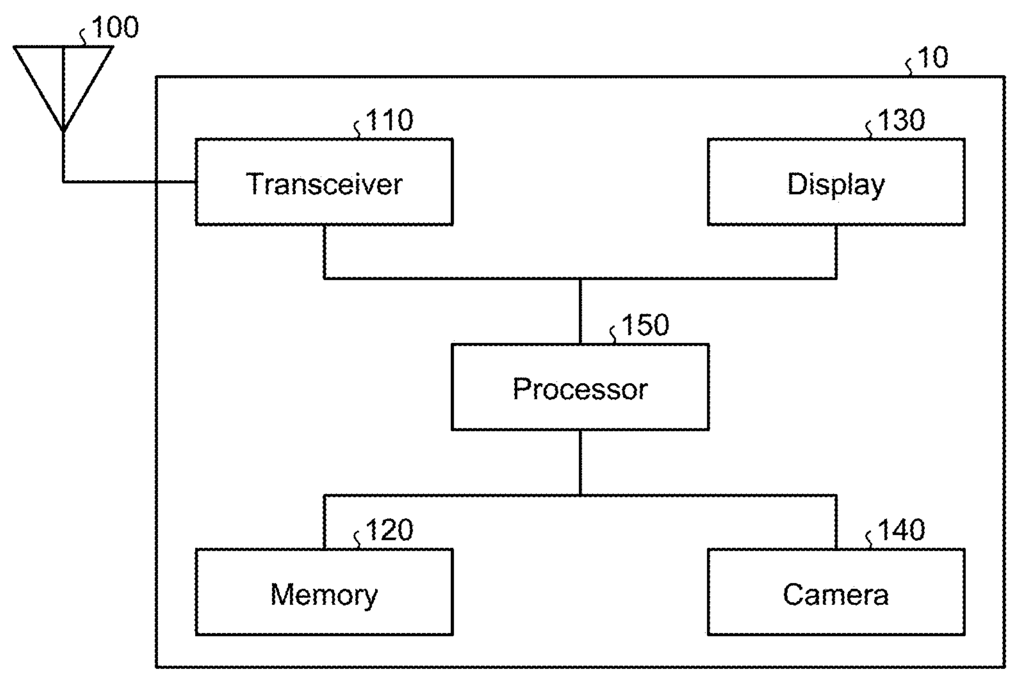
FIG. 5 is a block diagram illustrating an example of a configuration of a terminal device according to the first embodiment of the present disclosure.

Next, an example of a configuration of the terminal device 10 according to the first embodiment of the present disclosure will be described with reference to FIG. 5. FIG. 5 is a block diagram illustrating an example of the configuration of the terminal device 10 according to the first embodiment of the present disclosure.

For example, the terminal device 10 can be a head-mounted device (e.g., eyeglasses or goggles), that is, an HMD. For example, the terminal device 10 may adopt various structures such as a glass type and a helmet type. The terminal device 10 for displaying an AR image is classified into a video see-through type head-mounted display (HMD) or an optical see-through type HMD. Further, the terminal device 10 may be a contact lens type display. The HMD and the contact lens type display are sometimes collectively referred to as a near eye display. Note that the terminal device 10 may be a see-closed HMD compatible with VR, but is not limited thereto. For example, the terminal device 10 may be a retinal projection type HMD. Alternatively, the terminal device 10 may be a smartphone, or may be an information processing device including an imaging unit (e.g., camera) and a display unit (e.g., display), other than the smartphone.

As illustrated in FIG. 5, the terminal device 10 includes an antenna unit 100, a communication unit (transceiver) 110, a storage unit (memory) 120, a display unit (display) 130, an imaging unit (camera) 140, and a control unit (processor) 150. Note that the configuration illustrated in FIG. 5 is a functional configuration, and a hardware configuration may be different from this. Further, the functions of the terminal device 10 may be distributed to and implemented in a plurality of physically separated components.

The antenna unit 100 radiates a signal output from the communication unit 110 into a space, as radio waves. Further, the antenna unit 100 converts radio waves in the space into a signal and outputs the signal to the communication unit 110.

The communication unit 110 transmits and receives a signal. For example, the communication unit 110 receives a downlink signal from the base station 20 and transmits an uplink signal to the base station 20.

The storage unit 120 is a storage device, from which data can be read and in which data can be written, such as a DRAM, an SRAM, a flash memory, or a hard disk. The storage unit 120 functions as a storage means of the terminal device 10.

The display unit 130 is a display that displays the AR image data transmitted from the application server 30. The display unit 130 may be an optical see-through display or a non-transmissive (see-closed) display, that is, a video see-through display. In a case where the display unit 130 is the optical see-through display, the display unit 130 has optical transparency and displays a virtual object included in the AR image data on the display under the control of the control unit 150. In a case where the display unit 130 is the video see-through display, the display unit 130 superimposes and displays a virtual object included in the AR image data on a real image captured by the imaging unit 140 under the control of the control unit 150.

The imaging unit 140 is a camera that images the line-of-sight direction of the user. The imaging unit 140 captures an image in front of the user. As described above, in a case where the display unit 130 is the video see-through display, the images in front of the user captured by the imaging unit 140 may be sequentially displayed on the display unit 130.

The control unit 150 is a controller that controls each unit of the terminal device 10. The control unit 150 is implemented by, for example, a processor (hardware processor) such as a central processing unit (CPU) or a microprocessing unit (MPU). For example, the control unit 150 is implemented in a manner in which the processor executes various programs stored in the storage device inside the terminal device 10 by using a random access memory (RAM) or the like as a work area. Note that the control unit 150 may be implemented by an integrated circuit such as an application-specific integrated circuit (ASIC) or a field programmable gate array (FPGA). The CPU, the MPU, the ASIC, and the FPGA can all be regarded as the controller.

Note that, in addition to the above-described components, the terminal device 10 may have a component such as an input/output unit or an audio output unit such as a speaker.

1.3.3. Example of Configuration of Base Station

Figure 6:
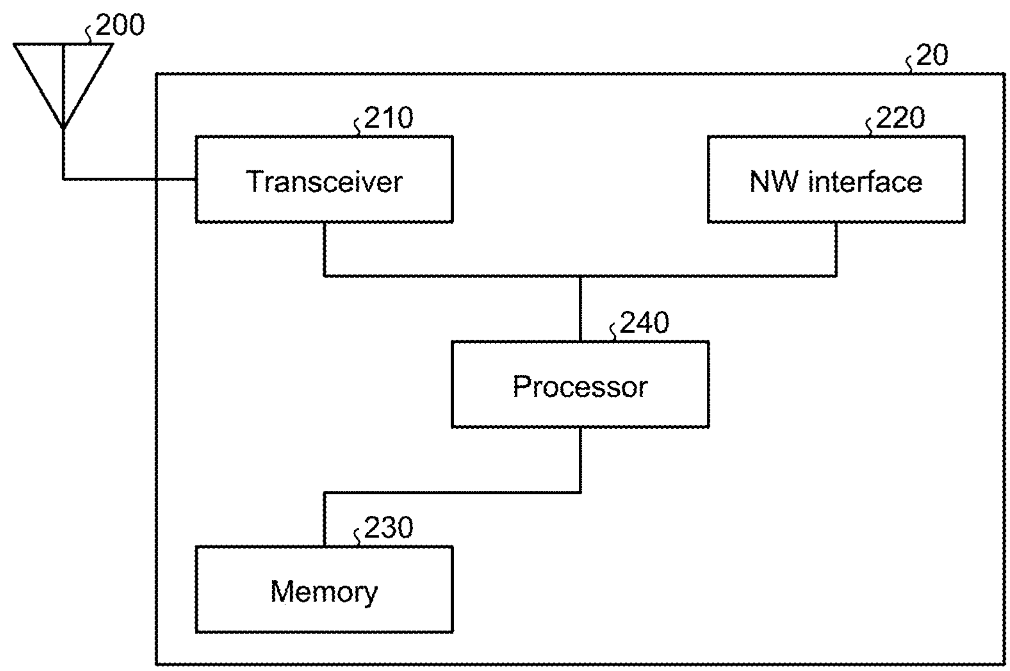
FIG. 6 is a block diagram illustrating an example of a configuration of a base station according to the first embodiment of the present disclosure.

Next, an example of a configuration of the base station 20 according to the first embodiment of the present disclosure will be described with reference to FIG. 6. FIG. 6 is a block diagram illustrating an example of the configuration of the base station 20 according to the first embodiment of the present disclosure.

As illustrated in FIG. 6, the base station 20 includes an antenna unit 200, a communication unit (transceiver) 210, a network communication unit (NW interface) 220, a storage unit (memory) 230, and a control unit (processor) 240. Note that the configuration illustrated in FIG. 6 is a functional configuration, and a hardware configuration may be different from this. Further, the functions of the base station 20 may be distributed to and implemented in a plurality of physically separated components.

The antenna unit 200 radiates a signal output from the communication unit 210 into a space, as radio waves. Further, the antenna unit 200 converts radio waves in the space into a signal and outputs the signal to the communication unit 210.

The communication unit 210 transmits and receives a signal. For example, the communication unit 210 receives an uplink signal from the terminal device 10 and transmits a downlink signal to the terminal device 10.

The network communication unit 220 is a communication interface for performing communication with a node located higher on the network (for example, the core network node 40 (see FIG. 4)). For example, the network communication unit 220 is a LAN interface such as an NIC. Further, the network communication unit 220 may be a wired interface or a wireless interface. The network communication unit 220 functions as a network communication means of the base station 20.

The storage unit 230 is a storage device, from which data can be read and in which data can be written, such as a DRAM, an SRAM, a flash memory, or a hard disk. The storage unit 230 functions as a storage means of the base station 20.

The control unit 240 is a controller that controls each unit of the base station 20. The control unit 240 is implemented by, for example, a processor (hardware processor) such as a central processing unit (CPU) or a microprocessing unit (MPU). For example, the control unit 240 is implemented in a manner in which the processor executes various programs stored in the storage device inside the base station 20 by using a random access memory (RAM) or the like as a work area. Note that the control unit 240 may be implemented by an integrated circuit such as an application specific integrated circuit (ASIC) or a field programmable gate array (FPGA). The CPU, the MPU, the ASIC, and the FPGA can all be regarded as the controller.

1.3.4. Example of Configuration of Application Server

Figure 7:
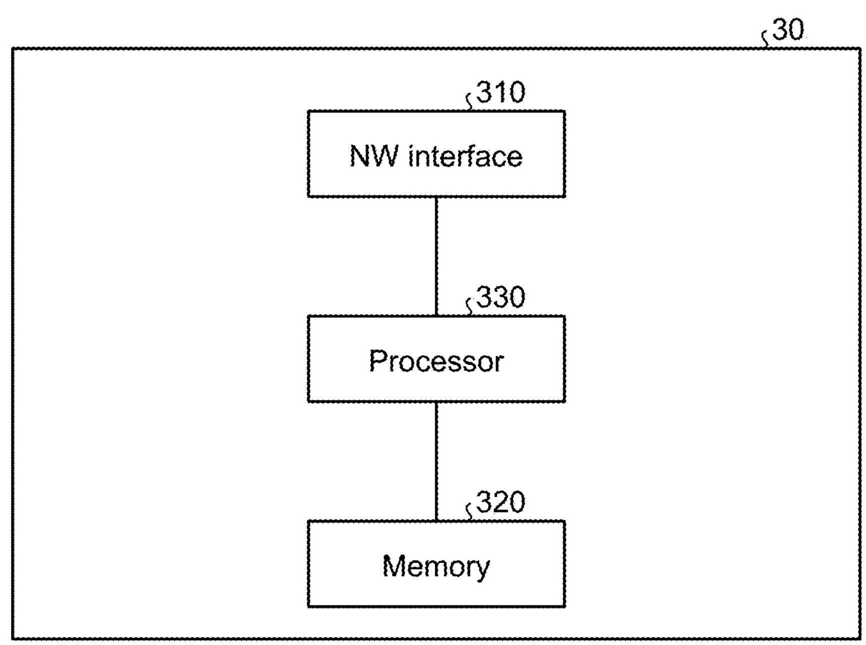
FIG. 7 is a block diagram illustrating an example of a configuration of an application server according to the first embodiment of the present disclosure.

Next, an example of a configuration of the application server 30 according to the first embodiment of the present disclosure will be described with reference to FIG. 7. FIG. 7 is a block diagram illustrating an example of the configuration of the application server 30 according to the first embodiment of the present disclosure.

As illustrated in FIG. 7, the application server 30 includes a network communication unit (NW interface) 310, a storage unit (memory) 320, and a control unit (processor) 330. Note that the configuration illustrated in FIG. 7 is a functional configuration, and a hardware configuration may be different from this. Further, the functions of the application server 30 may be distributed to and implemented in a plurality of physically separated components.

The network communication unit 310 is a communication interface for performing communication with a node located on the network (for example, the core network node 40 (see FIG. 4)). For example, the network communication unit 310 is a LAN interface such as an NIC. Further, the network communication unit 310 may be a wired interface or a wireless interface. The network communication unit 310 functions as a network communication means of the application server 30.

The storage unit 230 is a storage device, from which data can be read and in which data can be written, such as a DRAM, an SRAM, a flash memory, or a hard disk. The storage unit 230 stores, for example, a beam transmitted by the base station 20 (for example, the SSB index) and the correction information of the AR image data in association with each other. The storage unit 230 functions as a storage means of the application server 30.

The control unit 240 is a controller that controls each unit of the application server 30. The control unit 240 is implemented by, for example, a processor (hardware processor) such as a central processing unit (CPU) or a microprocessing unit (MPU). For example, the control unit 240 is implemented in a manner in which the processor executes various programs stored in the storage device inside the application server 30 by using a random access memory (RAM) or the like as a work area. Note that the control unit 240 may be implemented by an integrated circuit such as an application specific integrated circuit (ASIC) or a field programmable gate array (FPGA). The CPU, the MPU, the ASIC, and the FPGA can all be regarded as the controller.

1.4. Operation of Communication System

FIG. 8 is a sequence diagram illustrating an operation example of the communication system according to the first embodiment of the present disclosure. In this operation example, scenes (situations) that operate in Steps S101 and S102, which are preparatory steps, and scenes that operate in subsequent Steps S103 to S108 can be distinguished. That is, this operation example includes, for example, the preparatory steps (Steps S101 and S102) performed before the AR/VR event is held, and Steps S103 to S108 repeatedly performed during the AR/VR event.

In Step S101, as an advance preparation, a transmission direction of each beam transmitted from the base station 20 (gNB) is adjusted. For example, the configuration related to the antenna of the base station 20 (gNB) (e.g., the antenna tilt angle, the distance/wavelength between the antenna elements, the phase offset, and the reference transmit power) can be adjusted so that a predetermined area can be covered by a plurality of beams.

For example, in a two-dimensional direction, a direction of the beam at an arbitrary angle θ can be obtained from the following equation.

[Math 1]

$$\Delta\varphi = \frac{2\pi d \sin\theta}{\lambda} \quad \text{(Equation 1)}$$

Figure 9:
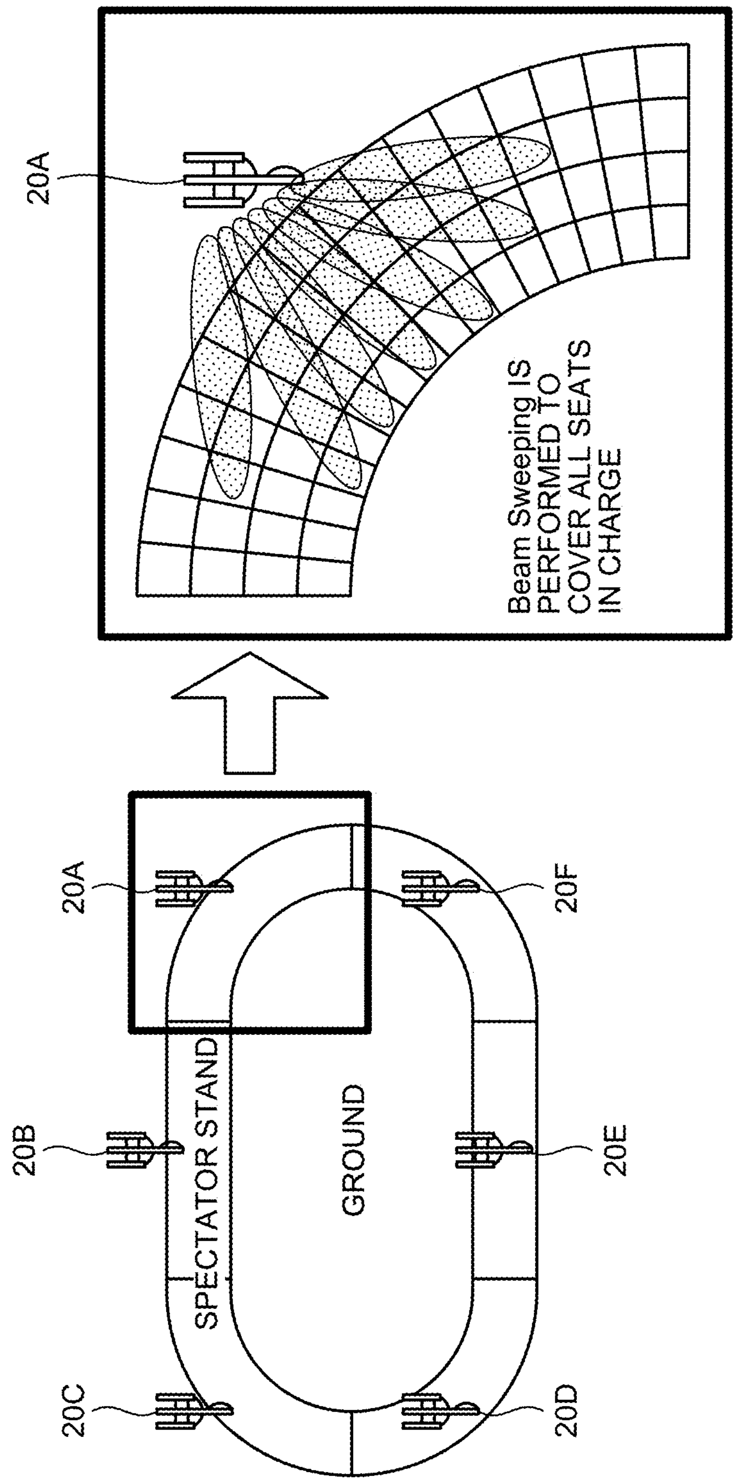
FIG. 9 is a diagram for describing association between a beam and a seat group according to the first embodiment of the present disclosure.
Figure 10:
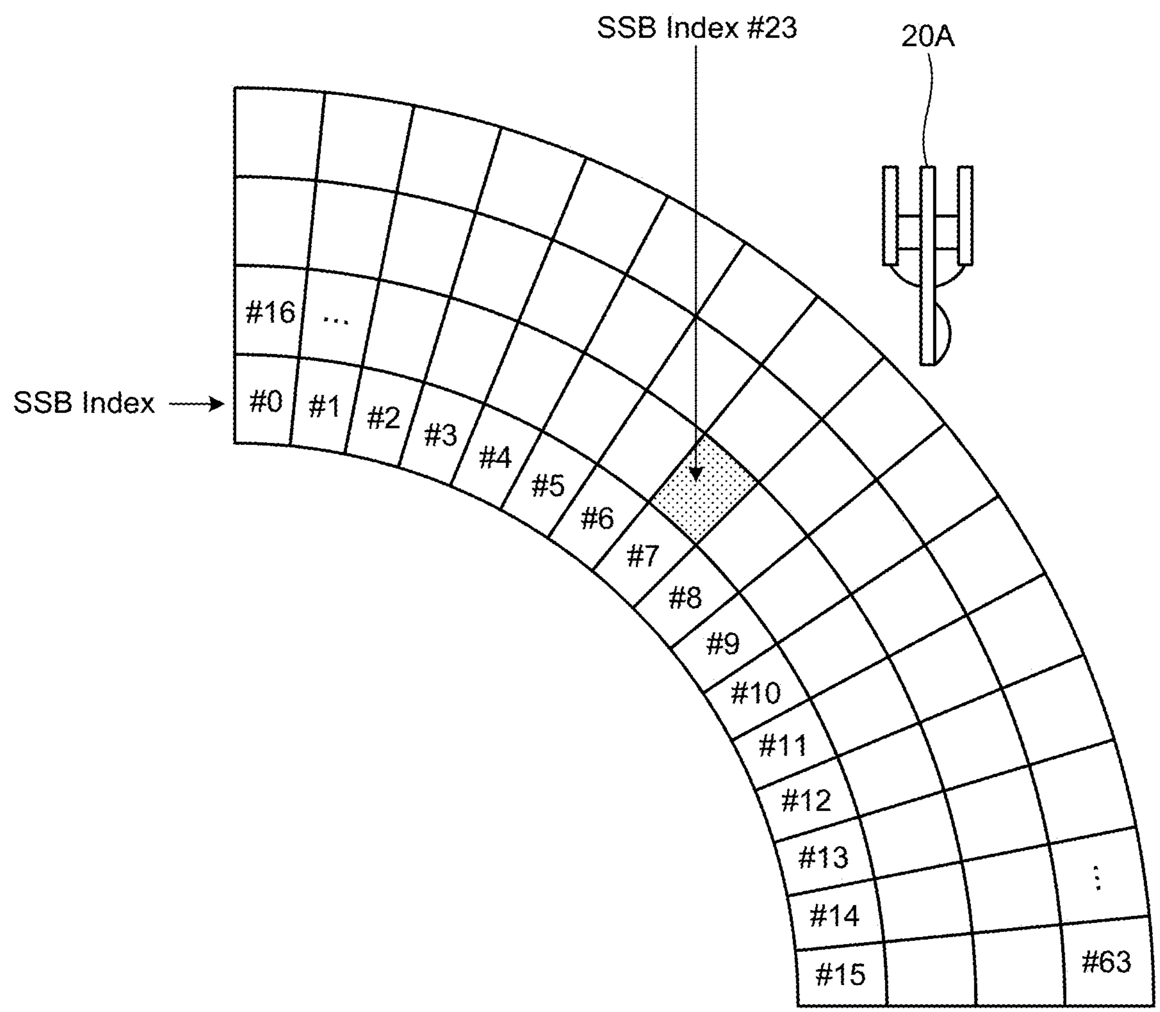
FIG. 10 is a diagram for describing the association between the beam and the seat group according to the first embodiment of the present disclosure.

Here, d is the distance between the plurality of antenna elements, λ is the wavelength of the signal, and Δϕ is the phase offset. For example, the configuration related to the antenna is adjusted by using (applying) (Equation 1) so that a predetermined area can be covered by a plurality of beams. In a case where the use case to which the present embodiment is applied is an AR/VR event at a large-scale facility such as the stadium ST, an area covered by one beam may be associated with a seat group including one or more seats. FIGS. 9 and 10 illustrate an example of a case of associating a plurality of beams (SSBs) with a seat group including one or more seats in a large-scale facility such as the stadium ST. FIGS. 9 and 10 are diagrams for describing the association between the beam and the seat group according to the first embodiment of the present disclosure.

For example, as described above, in a case of FR2 (a band of 6 GHz or higher), the maximum number of SSBs transmitted per unit time (half frame: 5 ms) is 64. In other words, beams are formed in 64 different directions, and beams in 64 directions are sequentially transmitted (broadcast) from the base station 20 (gNB) during a unit time (one SS burst). Therefore, the configuration of the antenna of the base station 20 (gNB) is adjusted so that one beam corresponds to a seat group including one or more seats. In other words, in a case where the terminal device 10 is located in a seat group including one or more seats, the antenna configuration is adjusted so that a predetermined beam (SSB) becomes the best beam for the terminal device 10 (the best beam whose radio quality is the best). As a result, it is possible to associate the spectator seat(s) with beams (i.e., 64 SSB indexes) in 64 different directions.

Next, in Step S102, information (correction information) regarding a relative position of an area that can be covered by one beam with respect to a reference point for displaying the AR image, and a corresponding beam are associated per each of the plurality of beams.

More specifically, a position (e.g., latitude/longitude) of the reference point (real object) on which the virtual object is to be superimposed is set in advance. Then, the correction information (the direction and distance of an area covered by one beam from the reference point) is set so that the virtual object is superimposed on the reference point in an appropriate direction and distance when the user adjusts the camera (e.g., the camera 140 provided in the terminal device 10 (see FIG. 5)) to be oriented toward the reference point from an area covered by a certain beam (SSB), and the correction information and a corresponding beam (SSB) are associated with each other. The reference point may be simple enough that the presence of the reference point can be recognized by the camera 140 included in the terminal device 10. For example, it does not have to be complicated (highly accurate) enough to identify the direction or pattern of a marker required for the marker-based recognition. Similarly, there may be no prominent point feature (interest point or key point) on a target object required for the marker-less recognition (i.e., the camera does not have to be a high-precision camera enough to enable recognition). This is because the direction and distance with respect to the reference point can be identified by the correction information (the direction and distance of the area covered by one beam from the reference point).

Figure 11:
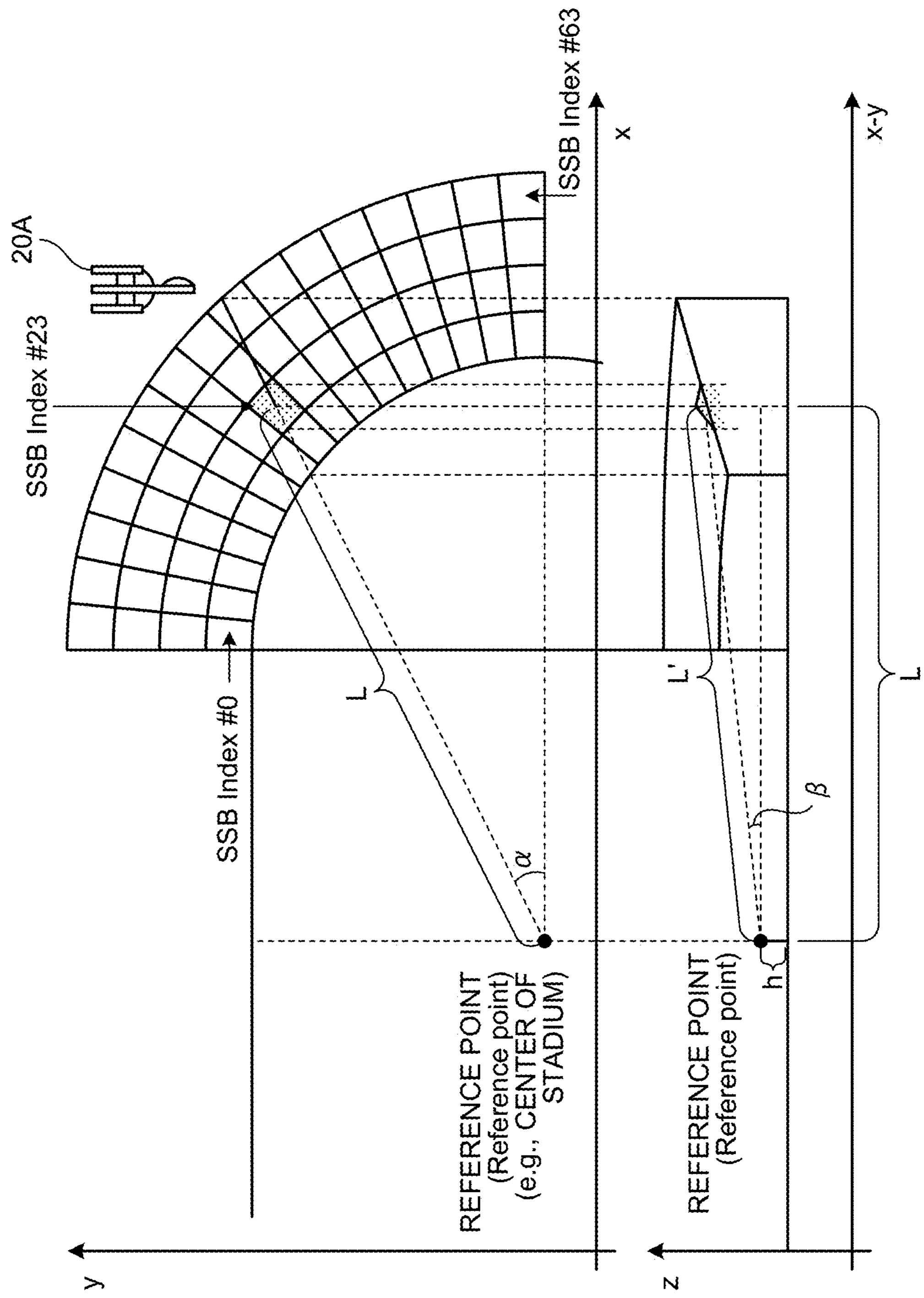
FIG. 11 is a diagram for describing correction information according to the first embodiment of the present disclosure.

A specific example of the correction information will be described. FIG. 11 is a diagram for describing the correction information according to the first embodiment of the present disclosure. In FIG. 11, it is assumed that the AR image is viewed from a predetermined spectator seat(s) in a large-scale facility such as the stadium ST. A case where the correction information (the direction and distance of an area covered by one beam from the reference point) is set so that the virtual object is superimposed on the reference point in an appropriate direction and distance in such a case will be described.

FIG. 11 includes an x-y plane when a large-scale facility (for example, the stadium ST) is viewed from directly above (in a direction perpendicular to the ground on the earth) and a z-(x-y) plane perpendicular to the x-y plane. In the x-y plane of FIG. 11, a distance between a central portion of an area covered by a beam identified by an SSB index #23 (an area where radio quality of the beam identified by the SSB index #23 is best for the terminal device 10 when the terminal device 10 measures the synchronization signal) and the reference point (e.g., a point serving as a reference for superimposition of the AR image data (virtual object) such as a central point in a large-scale facility) is L, and an angle from an x-axis direction of the x-y plane is a.

Furthermore, in the z-(x-y) plane of FIG. 11, a distance between the central portion of the area covered by the beam identified by the SSB index #23 and the reference point is represented by L', and an angle between L and L' in the z-(x-y) plane is 13. Note that, in the z-(x-y) plane, the reference point is provided at a point having a height h from the ground, but the height h may be zero. Here, in a case where x, y, and z coordinates of the central portion of the area covered by the beam identified by the SSB index #23 when x, y, and z coordinates of the reference point are (0, 0, 0) are ($X_{SSB\_23}$, $Y_{SSB\_23}$, $Z_{SSB\_23}$), Equation 2 is valid.

[Math 2]

$$\begin{pmatrix} X_{SSB\_23} \\ Y_{SSB\_23} \\ Z_{SSB\_23} \end{pmatrix} = \begin{pmatrix} L'\cos\alpha\cos\beta \\ L'\sin\alpha\cos\beta \\ L'\sin\beta + h \end{pmatrix} \quad \text{(Equation 2)}$$

Therefore, (L', α, and β) obtained from Equation 3 which is a modification of Equation 2 are associated, as the correction information used for aligning the AR image to be displayed on the display 130 of the terminal device 10 for which radio quality of the beam of the SSB index #23 is best, with the corresponding beam (i.e., SSB index).

[Math 3]

$$\begin{pmatrix} L' \\ \alpha \\ \beta \end{pmatrix} = \begin{pmatrix} \sqrt{X_{SSB\_23}^2 + Y_{SSB\_23}^2 + (Z_{SSB\_23} - h)^2} \\ \tan^{-1}\dfrac{Y_{SSB\_23}}{X_{SSB\_23}} \\ \cos^{-1}\dfrac{\sqrt{X_{SSB\_23}^2 + Y_{SSB\_23}^2}}{\sqrt{X_{SSB\_23}^2 + Y_{SSB\_23}^2 + (Z_{SSB\_23} - h)^2}} \end{pmatrix} \quad \text{(Equation 3)}$$

These associations may be made prior to service provision to the terminal device 10. For example, the application server 30 may acquire information regarding the beam (e.g., the SSB index and a corresponding antenna configuration information list) from the base station 20 (gNB) via the core network (e.g., the core network node 40). For example, the application server 30 may acquire the information regarding the beam via the base station 20 (gNB) or the API provided by the core network. In a case where the present embodiment is applied to the edge computing, the API is provided to the application server 30 via a reference point "EDGE-7" between the 3GPP Network (including the base station 20 (gNB) and the core network) and the edge application server. For example, the edge application server can access a 3GPP network function and the API (via the API exposed by the NEF). In addition or instead, the API may be provided to the application server 30 via a reference point "EDGE-2" between the 3GPP Network (including the base station 20 (gNB) and the core network) and an edge enabler server, and a reference point "EDGE-3" between the edge enabler server and the edge application server. In addition or instead, the API may be provided to the application server 30 via a reference point "EDGE-8" between the 3GPP Network (including the base station 20 (gNB) and the core network) and an edge data network configuration server, a reference point "EDGE-6" between the edge data network configuration server and the edge enabler server, and the reference point "EDGE-3" between the edge enabler server and the edge application server. Details thereof will be described later.

Return to the description of FIG. 8. In Step S103, the base station 20 (gNB) broadcasts the synchronization signal (e.g., SSB) in the cell. More specifically, the base station 20 (gNB) broadcasts a plurality of synchronization signals in different directions by performing beam sweeping in which a plurality of synchronization signals are beamformed in different directions and sequentially transmitted. For each synchronization signal transmitted in this step, the angle and reference transmit power are adjusted in advance in the configuration related to the antenna in Step S101. For example, in the present embodiment, beams are formed in 64 different directions, and beams in 64 directions are sequentially transmitted (broadcast) from the base station 20 (gNB) during a unit time (one SS burst).

In Step S104, the terminal device 10 receives (detects) at least one synchronization signal (e.g., SSB) transmitted by beam sweeping and measures radio quality of each synchronization signal. The radio quality here may be, but is not limited to, any one or a combination of reference signal received power (RSRP), reference signal received quality (RSRQ), signal interference to noise ratio (SINR), received signal strength indicator (RSSI), and channel state information (CSI). The RSRP here may be secondary synchronization signal reference signal received power (SS-RSRP). The RSRQ here may be secondary synchronization signal reference signal received quality (SS-RSRQ). The SINR here may be secondary synchronization signal interference to noise ratio (SS-SINR). That is, a measurement target of the synchronization signal (e.g., SSB) may be limited to the secondary synchronization signal. Then, in a case where the radio quality of the measured synchronization signal is higher than a predetermined threshold, the synchronization signal is determined as a synchronization signal of the best beam for the terminal device 10. The best beam for the terminal device 10 (beam A in FIG. 8) is reported to the network by using a synchronization signal index (e.g., SSB index). In a case where there are a plurality of synchronization signals whose radio quality is higher than the predetermined threshold, the terminal device 10 may report only the beam having the highest radio quality to the network, or report a plurality or all of the beams satisfying the predetermined threshold to the network. The report is made in Step S105.

In Step S105, the terminal device 10 performs the random access procedure with the base station 20 (gNB). As described above, the random access procedure includes transmission of a random access preamble, reception of a random access response, and subsequent reception of Message 3 (Msg3). That is, the terminal device 10 transmits the random access preamble to the base station 20 (gNB).

For example, according to 3GPP TS 38.211, as for the preambles transmitted by terminal device 10, 64 different preambles are allocated to each RACH occasion. Therefore, when a plurality of terminal devices 10 transmit the preambles at the same RACH occasion, in a case where different preambles are used, the base station 20 can separate and discriminate the preambles. RACH-Config including the RACH occasion is notified by system information (e.g., system information block (SIB) 1) provided by the base station 20. The SSB index corresponding to a certain beam and the RACH occasion can be associated with each other in a one-to-one relationship. Therefore, by confirming at which RACH occasion the terminal device 10 has transmitted the preamble, the base station 20 can identify the best SSB index, that is, the best beam for the terminal device 10.

The base station 20 (gNB) transmits the random access response in response to the reception of the random access preamble. Since the RACH occasion at which the random access preamble is transmitted is associated with the best SSB index or the best beam for the terminal device 10, the base station 20 can recognize the best beam for the terminal device 10 based on the SSB index associated with the RACH occasion. Then, the random access response transmitted from the base station 20 is beamformed and transmitted in the same direction as the beam corresponding to the SSB index. In subsequent communications (e.g., transmission of Msg3 and RRC setup procedure), a beam directed in the same direction is used unless the beam is switched.

The application server 30 determines to provide the application (e.g., AR image data) to the terminal device 10 at an arbitrary timing. This determination may be performed on the basis of an explicit or implicit request from the terminal device 10. The explicit request here may be made by transmitting a request message from the terminal device 10 to the application server 30, or the implicit request may be determination in the application server 30 under the condition that subscription data of the terminal device 10 indicates that provision of the application is subscribed or allowed. Then, in Step S106, the application server 30 acquires information (e.g., SSB index) regarding the best beam for the terminal device 10. For example, the application server 30 may acquire the information regarding the SSB index from the base station 20 (gNB) via the core network node 40. For example, the application server 30 may acquire the information regarding the SSB index via the API provided by the base station 20 (gNB) or the core network node 40. In a case where the present embodiment is applied to the edge computing, the API is provided to the application server 30 via a reference point "EDGE-7" between the 3GPP Network (including the base station 20 (gNB) and the core network) and the edge application server. For example, the edge application server can access a 3GPP network function and the API (via the API exposed by the NEF). In addition or instead, the API may be provided to the application server 30 via a reference point "EDGE-2" between the 3GPP Network (including the base station 20 (gNB) and the core network) and an edge enabler server, and a reference point "EDGE-3" between the edge enabler server and the edge application server. In addition or instead, the API may be provided to the application server 30 via a reference point "EDGE-8" between the 3GPP Network (including the base station 20 (gNB) and the core network) and an edge data network configuration server, a reference point "EDGE-6" between the edge data network configuration server and the edge enabler server, and the reference point "EDGE-3" between the edge enabler server and the edge application server. Details thereof will be described later.

Then, the application server 30 determines the correction information (e.g., angle/distance) used for displaying the AR image data associated with the SSB index in advance based on the acquired information regarding the SSB index. Then, in Step S107, the application server 30 renders the AR image data by using the correction information, and transmits the rendered (e.g., aligned using the correction information) corrected AR image data to the terminal device 10. Note that the rendering here may be any one of the cloud rendering, the edge rendering, or the split rendering described above.

In Step S108, the terminal device 10 displays the received corrected AR image data on the display 130. As a result, the virtual object included in the corrected AR image data can be superimposed on the real object imaged by the camera 140.

In this way, the corrected AR image data that has been appropriately aligned according to the location of each user (terminal device 10) can be provided to each user (terminal device 10). The user can view the AR image M1 (see FIG. 1) in which the corrected AR image data that has been appropriately aligned and the real image are superimposed.

Note that in a case where the use case to which the present embodiment is applied is an AR/VR event in a large-scale facility such as the stadium ST, a possibility that (the user who uses) the terminal device 10 moves is lower as compared with other cases. Therefore, even in a case where only one reference point imaged by the camera 140 included in the terminal device 10 and the correction information associated with the best beam (SSB) for the terminal device 10 (the direction and distance of the area covered by one beam from the reference point) are used to align the virtual object, the AR image can be displayed on the display to the extent that the user does not feel uncomfortable.

1.5. Modified Examples

1.5.1. First Modified Example

The first embodiment describes a case where the application server 30 generates the corrected image data obtained by correcting the AR image data based on the correction information. In addition to the above example, the application server 30 may transmit the correction information associated with the best beam to the terminal device 10, and the terminal device 10 may correct the AR image data. Therefore, in a first modified example of the first embodiment, a case where the terminal device 10 generates the corrected AR image data based on the correction information will be described.

FIG. 12 is a sequence diagram illustrating an operation example of the communication system according to the first modified example of the first embodiment of the present disclosure. The operation of the communication system illustrated in FIG. 12 until the application server 30 acquires the information regarding the best beam in Step S106 is the same as the operation illustrated in FIG. 8. The application server 30 that has acquired the information regarding the best beam in Step S106 determines the correction information (e.g., angle/distance) used for displaying the AR image data associated with the information regarding the SSB index based on the acquired information regarding SSB index information.

The application server 30 determines to provide the application (e.g., AR image data) to the terminal device 10 at an arbitrary timing. The timing of the determination is the same as the operation illustrated in FIG. 8.

Then, in Step S201, the application server 30 transmits the AR image data and the correction information corresponding to the best beam A to the terminal device 10.

In Step S202, the terminal device 10 performs correction such as alignment on the received AR image data by using the correction information.

Subsequently, in Step S108, the virtual object included in the corrected AR image data is superimposed on the real object (real image) imaged by the camera 140 and displayed on the display 130.

In this way, the terminal device 10 can appropriately perform alignment by using the correction information according to the location of each user (terminal device 10). The user can view the AR image M1 (see FIG. 1) in which the corrected AR image data that has been appropriately aligned and the real image are superimposed.

1.5.2. Second Modified Example

In the above first modified example, the application server 30 determines the correction information based on the best beam. In addition to the above example, the terminal device 10 may determine the correction information based on the best beam. Therefore, in a second modified example of the first embodiment, a case where the terminal device 10 determines the correction information based on the best beam will be described.

FIG. 13 is a sequence diagram illustrating an operation example of the communication system according to the second modified example of the first embodiment of the present disclosure. The operation of the communication system illustrated in FIG. 13 until the application server 30 acquires the information regarding the best beam in Step S106 is the same as the operation illustrated in FIG. 8.

The application server 30 determines to provide the application (e.g., AR image data) to the terminal device 10 at an arbitrary timing. The timing of the determination is the same as the operation illustrated in FIG. 8.

In Step S301, the application server 30 transmits the AR image data and the correction information corresponding to all the beams to the terminal device 10. For example, the application server 30 transmits all combinations of the beam (SSB index) and the correction information to the terminal device 10.

In Step S302, the terminal device 10 selects the correction information corresponding to the best beam (here, beam A) determined in Step S104 from a plurality of pieces of received correction information.

Note that the subsequent operations are the same as the operations of the communication system of the first modified example illustrated in FIG. 12.

In this way, the terminal device 10 can appropriately align the AR image data by selecting the correction information according to the location of each user (terminal device 10). The user can view the AR image M1 (see FIG. 1) in which the corrected AR image data that has been appropriately aligned and the real image are superimposed.

2. Second Embodiment

In a second embodiment, details of generation of the AR image data performed by the application server 30 according to the first embodiment will be described. Specifically, an example in which reduction of an unviewable part (information regarding a surface shape and a color on the opposite side from the viewing direction) from virtual object data (AR image data) is made according to a location of a terminal device 10, and the virtual object data is provided to the terminal device 10 will be described.

A configuration of a communication system in the present embodiment is the same as the communication system illustrated in FIG. 4 in the first embodiment. That is, the communication system in the present embodiment includes the terminal device 10 (UE), a base station 20 (gNB), a core network node 40 (e.g., UPF), and an application server 30 (e.g., (edge) application server).

In the present embodiment, data configured by a point cloud, which is a set of points having position information and attribute information (for example, color information or reflection information) at the same time in a three-dimensional space, will be described as an example of the virtual object data. However, specific examples of the virtual object data are not limited thereto. In other words, the virtual object data rendered as 3D data does not have to be the data configured by the point cloud.

Figure 14:
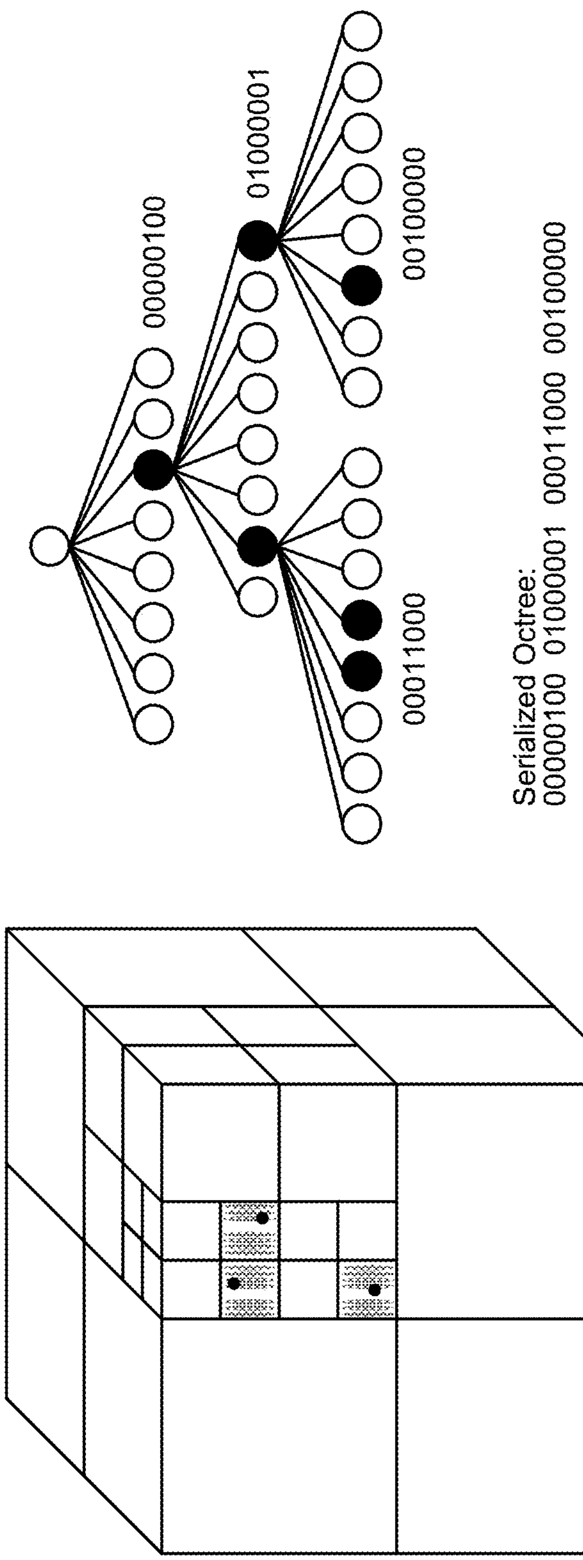
FIG. 14 is a diagram for describing a configuration of a point cloud.

For example, in the point cloud, data is separated into geometry, which indicates a three-dimensional structure, and attribute, which indicates color information or reflection information, and encoded. Octree encoding as illustrated in FIG. 14 is used to compress geometry. For example, the octree encoding is a method of expressing the presence or absence of points in each block by an octree in data expressed by a voxel. In this method, as illustrated in FIG. 14, a block with points is represented by 1 and a block without points is represented by 0. Note that FIG. 14 is a diagram for describing a configuration of the point cloud.

In a case where the point cloud is used for the AR image data, a geometry-based point cloud compression (G-PCC) stream in which 3D structure information of a point cloud object is uniformly compressed by the octree encoding as illustrated in FIG. 14 is used for delivery. Note that the term “G-PCC stream” may be an example of the virtual object data (AR image data) in the above-described first embodiment and modified example. In this way, when uniformly compressed by the octree encoding, the delivered G-PCC stream has three-dimensional information that is viewable from the surrounding 360°, and the fineness of the entire circumference is the same. In other words, whether or not the points included in the point cloud are dense (that is, whether or not the delivered G-PCC stream has high definition) is proportional to the amount of data.

Therefore, in the present embodiment, when the G-PCC stream is generated, encoding is made by changing the fineness (octree depth) that divides the voxel for each part of the point cloud object, and changing the definition for each part. For example, a portion (information regarding the surface shape and color in the viewing direction) that is viewable from the terminal device 10 according to the location of the terminal device 10 is set to have high definition (depth=10) and encoded. On the other hand, a portion (information regarding the surface shape and color on the opposite side from the viewing direction) that is unviewable from the terminal device 10 according to the location of the terminal device 10 is set to have low definition (depth=5) or be not drawn (depth=0) and encoded.

In the present embodiment, the viewable portion is determined (specified) based on the correction information (e.g., information regarding the direction and distance of the area covered by one beam (SSB) from the reference point) described in the first embodiment. These processings may be performed in the application server 30. Then, the encoded AR image data (i.e., G-PCC stream) is provided from the application server 30 to the terminal device 10.

For example, information indicating a direction of the G-PCC stream rendered in high definition can be provided from the application server 30 (media presentation description (MPD) file server) to the terminal device 10 (MPEG-DASH client) by extension of dynamic adaptive streaming over HTTP (DASH MPD). The media presentation description (MPD) is described in XML and includes Presentation, Period, AdaptationSet, Representation, and Segment. Among these, AdaptationSet represents units such as video, audio, and subtitles, and includes a plurality of Representations. Representation is information such as a video/audio bit rate, a resolution, and an aspect ratio. Information (field) indicating the direction in which rendering is made in high definition can be newly defined in this AdaptationSet. That is, the information (field) can be newly defined in an attribute “direction” of an element “gpcc:directionInfo”. Further, in a case where the correction information (e.g., the information regarding the direction and distance of the area covered by one beam (SSB) from the reference point) described in the first embodiment is signaled to the terminal device 10 (e.g., a case where the sequence of FIG. 12 or the sequence of FIG. 13 is adopted), these pieces of correction information may also be newly defined as a field (i.e., the attribute “direction” of the element “gpcc:directionInfo”) in AdaptationSet.

In addition, six directions including 0: X+, 1: Y+, 2: X−, 3: Y−, 4: Z+, and 5: Z− can be set as possible values of the attribute “direction” based on local coordinates of the point cloud. Also for the correction information (e.g., information regarding the direction and distance of the area covered by one beam (SSB) from the reference point) described in the first embodiment, six directions including 0: X+, 1: Y+, 2: X−, 3: Y−, 4: Z+, and 5: Z− may be set. A coordinate system of the local coordinates of the point cloud and a coordinate system for indicating the direction and the distance included in the correction information described in the first embodiment may be matched (synchronized). Alternatively, instead, at least one coordinate axis (e.g., x axis) of the local coordinates of the point cloud may be matched (synchronized) with a direction indicated by L' (the distance between a central portion of an area covered by a beam identified by a certain SSB index and the reference point) described in the first embodiment.

Here, a spatial division method and spatial position information will be described.

For example, the shape of the point cloud object is changed frame by frame at the maximum. Therefore, spatial division is performed by applying a certain division rule that does not depend on the change in the shape of the point cloud object. Specifically, a partial point cloud object contained in a rectangular parallelepiped block (hereinafter, appropriately referred to as a block) that occupies relatively the same spatial position with respect to a box containing the entire point cloud object (hereinafter, appropriately referred to as an object box) is encoded as a single partial G-PCC stream.

FIG. 15 is a diagram for describing the spatial division method and the spatial position information according to the second embodiment of the present disclosure. FIG. 15 illustrates an example of dividing the object box in half in an X-axis direction.

As illustrated in FIG. 15, the object box containing the entire point cloud object at a time t0 is divided in half in the x-axis direction into partial point cloud objects t0-*a* and to t0-*b*. Similarly, at a time t1, the object box is divided into partial point cloud objects t1-*a* and t1-*b*, and at a time t2, the object box is divided into partial point cloud objects t2-*a* and t2-*b*. Then, the G-PCC stream of a includes the partial point cloud object t0-*a*, the partial point cloud object t1-*a*, and the partial point cloud object t2-*a*. On the other hand, the G-PCC stream of b includes the partial point cloud object t0-*b*, the partial point cloud object t1-*b*, and the partial point cloud object t2-*b*. Note that, in FIG. 15, at an arbitrary time t, the entire point cloud object is divided into the partial point cloud object a and the partial point cloud object b in the x-axis direction, but the present invention is not limited thereto. For example, the entire point cloud object may be divided in a y-axis direction or may be divided in a z-axis direction according to the viewing direction of the user. Alternatively, instead, in a case where at least one coordinate axis (e.g., x axis) is not matched (synchronized) with the direction indicated by L' (the distance between a central portion of an area covered by a beam identified by a certain SSB index and the reference point) described in the first embodiment, the division described in FIG. 15 may be division in the direction indicated by L' described in the first embodiment.

According to this method, a relative spatial position of the partial point cloud object contained in the partial G-PCC stream with respect to the entire point cloud object is dynamically invariant. In a case where the relative spatial position is dynamically changed, a relationship between a viewing portion and the partial G-PCC stream containing the viewing portion is dynamically changed. Therefore, when a client acquires the G-PCC stream containing the viewing portion whose definition is enhanced, it becomes necessary to switch the high-definition G-PCC stream to be acquired even in a case where the viewing portion is invariant. Therefore, by this spatial division method, it is possible to eliminate the need to switch the high-definition G-PCC stream to be acquired when the viewing portion is invariant.

Operation Example of Application Server (MPD File Server)

Figure 16:
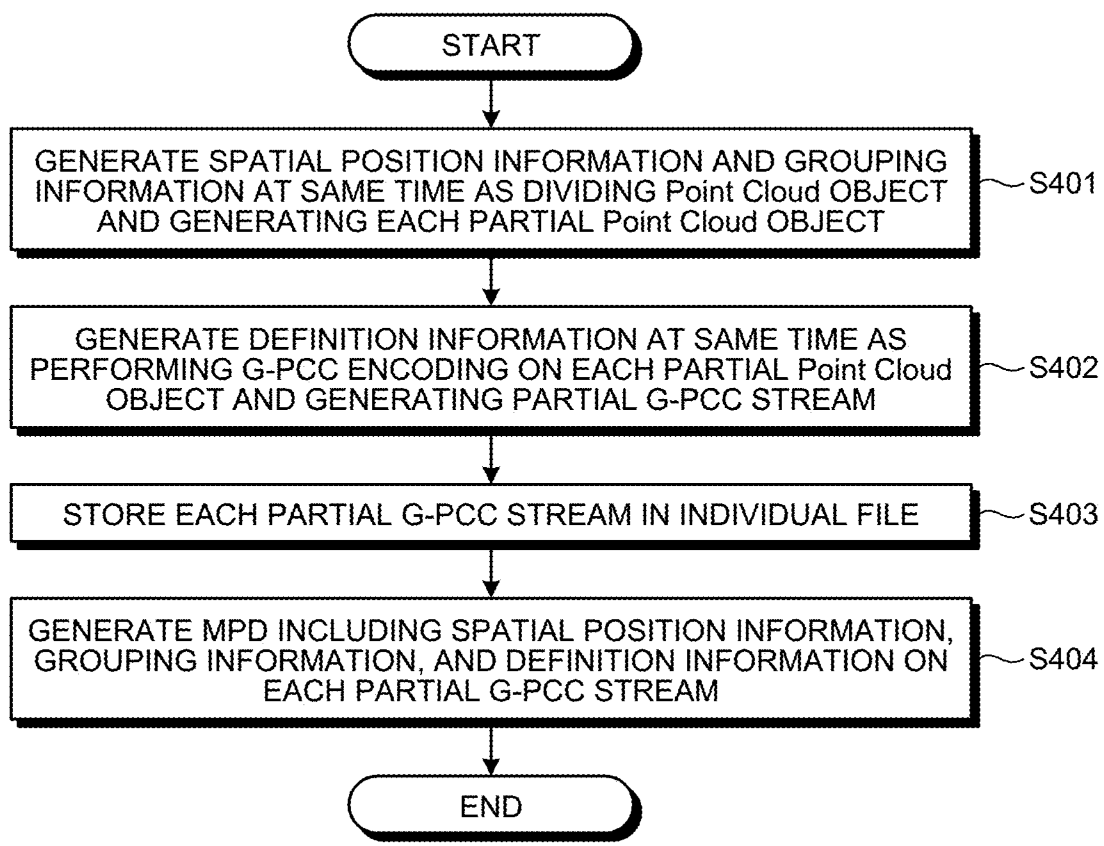
FIG. 16 is a flowchart for describing generation processing in which an application server (media presentation description (MPD) file server) generates a file storing a partial geometry-based point cloud compression (G-PCC) stream.

FIG. 16 is a flowchart for describing generation processing in which the application server 30 (MPD file server)

generates a file storing the partial G-PCC stream. Note that it is a detailed operation example of Step S107 illustrated in the sequence of FIG. 8 of the first embodiment, Step S201 illustrated in the sequence of FIG. 12 of the modified example, and Step S301 illustrated in the sequence of FIG. 13.

In Step S401, the application server 30 (MPD file server) divides the point cloud object and generates each partial point cloud object, and at the same time, generates the spatial position information and grouping information. More specifically, the application server 30 (MPD file server) generates the partial point cloud object corresponding to a portion that is viewable from the terminal device 10, and the partial point cloud object corresponding to a portion that is unviewable from the terminal device 10 by using the correction information (information regarding the direction and distance of the area that can be covered by one beam (SSB) from the reference point (real object)) associated with the best beam (SSB index) for the terminal device 10 (MPEG-DASH client). More specifically, the entire point cloud object is divided into a plurality of objects in the direction of the area that can be covered by one beam (SSB) from the reference point (real object).

In Step S402, the application server 30 (MPD file server) sets the octree depth of each partial point cloud object and then performs G-PCC encoding. As a result, the application server 30 (MPD file server) generates the partial G-PCC stream. At the same time, the application server 30 (MPD file server) generates definition information. More specifically, the application server 30 (MPD file server) sets the octree depth to a predetermined value (e.g., 10) for the partial point cloud object corresponding to the portion that is viewable from the terminal device 10, and sets the octree depth to a smaller value (e.g., 5 or 0) for the partial point cloud object corresponding to the portion that is unviewable from the terminal device 10.

In Step S403, the application server 30 (MPD file server) stores each partial G-PCC stream in an individual file and records the file in a memory.

In Step S404, the application server 30 (MPD file server) generates the MPD including the spatial position information, the grouping information, and the definition information of each partial G-PCC stream and stores the MPD in the memory. Then, the application server 30 (MPD file server) provides the MPD to the terminal device 10 (MPEG-DASH client) together with the file storing the partial G-PCC stream and recorded in the memory.

Operation Example of Terminal Device (MPEG-DASH Client)

Figure 17:
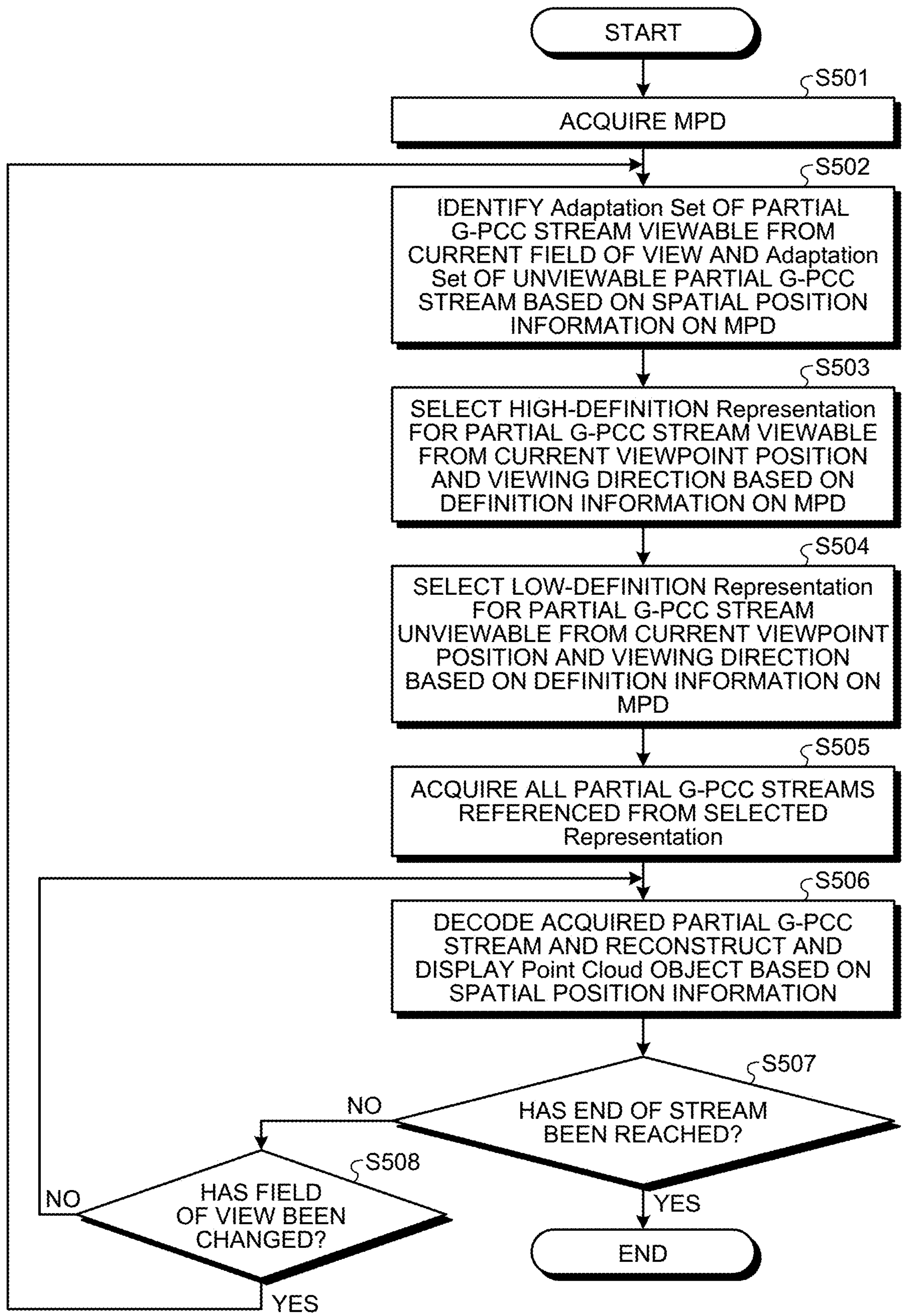
FIG. 17 is a flowchart for describing reproduction processing in which a terminal device (MPEG-DASH client) reproduces the file storing the partial G-PCC stream.

FIG. 17 is a flowchart for describing reproduction processing in which the terminal device 10 (MPEG-DASH client) reproduces the file storing the partial G-PCC stream. Note that it is a detailed operation example of Step S107 (Step S201 illustrated in the sequence of FIG. 12 of the modified example and Steps S301 illustrated in the sequence of FIG. 13) and S108 illustrated in the sequence of FIG. 8 of the first embodiment.

In Step S501, the terminal device 10 (MPEG-DASH client) acquires the MPD. More specifically, the MPD is provided from the application server 30 (MPD file server) to the terminal device 10 (MPEG-DASH client).

In Step S502, the terminal device 10 (MPEG-DASH client) identifies Adaptation Set of a viewable partial G-PCC stream and Adaptation Set of an unviewable part G-PCC based on the spatial position information of the MPD acquired in Step S501.

In Step S503, the terminal device 10 (MPEG-DASH client) selects high-definition Representation for the viewable partial G-PCC stream based on the definition information of the MPD.

In Step S504, the terminal device 10 (MPEG-DASH client) selects low-definition Representation for the unviewable partial G-PCC stream based on the definition information of the MPD.

In Step S505, the terminal device 10 (MPEG-DASH client) acquires all the partial G-PCC streams referenced from Representation selected in Step S503 and Step S504.

In Step S506, the terminal device 10 (MPEG-DASH client) decodes the acquired partial G-PCC stream, reconstructs the point cloud object based on the spatial position information, and renders a display screen. Then, the rendered AR image is displayed on the display of the terminal device 10 (MPEG-DASH client).

In Step S507, the terminal device 10 (MPEG-DASH client) determines whether or not the end of the stream has been reached. In a case where the terminal device 10 (MPEG-DASH client) determines in Step S507 that the end of the stream has not been reached, the processing proceeds to Step S508.

In Step S508, the terminal device 10 (MPEG-DASH client) determines whether or not a field-of-view direction (viewing direction) has been changed, and in a case where it is determined that the field-of-view direction has not been changed, the processing returns to Step S506. In a case where it is determined that the field-of-view direction has been changed, the processing returns to Step S502, and the same processing is repeated thereafter. The change in field-of-view direction in Step S508 may be detected by various sensors (at least one of the sensors described above) provided in the terminal device 10 (MPEG-DASH client) or may be detected based on a change (beam switching) of the SSB index corresponding to the best beam for the terminal device 10 (MPEG-DASH client).

On the other hand, in Step S507, in a case where the terminal device 10 (MPEG-DASH client) determines that the end of the stream has been reached, the processing ends.

As a result, the terminal device 10 acquires the G-PCC stream encoded so as to have high definition for the portion that is viewable from the location of the terminal device 10 (information regarding the surface shape and color in the viewing direction), and can acquire the G-PCC stream encoded so as to have low definition for other portions. As a result, it is possible to align the point cloud object in consideration of the location of the terminal device 10 with respect to the real object and output the AR image while suppressing the amount of data from the application server 30 to the terminal device 10. In particular, in a large-scale facility such as a stadium, the number of terminal devices 10 is expected to be enormous, and thus, when assuming the use case such as an AR/VR event, the limitation of network bandwidth can become a bottleneck. Therefore, suppressing the amount of data for one user contributes to preventing deterioration of the quality of experience for the user. Furthermore, in a case where the use case to which the present embodiment is applied is an AR/VR event in a large-scale facility such as the stadium ST, a possibility that (the user who uses) the terminal device 10 moves is lower as compared with other cases. This is because the user who views the AR/VR event views the AR/VR event while sitting in a seat in a stadium or the like. Therefore, as in the present embodiment, even in a case where the portion that is unviewable from the terminal device 10 (the information regarding the surface shape and color on the opposite side from the viewing direction) is set to have low definition (depth=5) or be not drawn (depth=0) and is encoded, the possibility or frequency that the unviewable part become viewable by movement of the terminal device 10 is low, and from this viewpoint as well, it is possible to contribute to preventing deterioration of the quality of experience of the user.

3. Third Embodiment

In a third embodiment, application examples of the first and second embodiments and modified examples will be described.

In the first and second embodiments and modified examples described above, acquisition of the information of the 3GPP network (including the base station and the core network) acquired by the application server 30 (e.g., the information regarding the above-described beam (e.g., the SSB index and the antenna setting information list corresponding thereto) and the SSB index of the best beam for the terminal device 10 to which the AR image data is provided) using the API may be implemented by the architecture of the edge computing and various APIs used for the edge computing.

Figure 18:
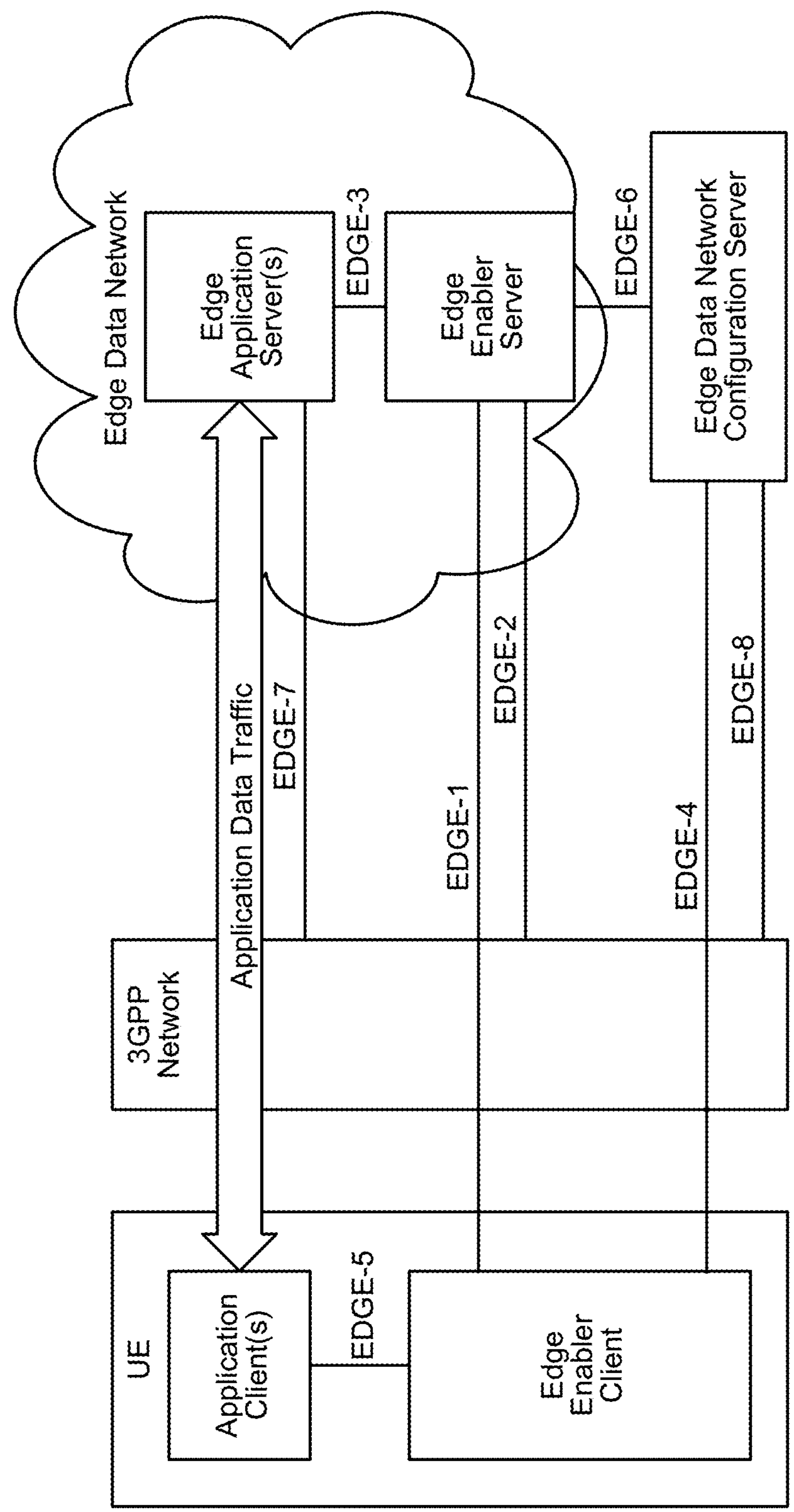
FIG. 18 is a diagram illustrating an example of an application architecture to which edge computing is applied.

FIG. 18 is a diagram illustrating an example of an application architecture to which the edge computing is applied. The diagram illustrated in FIG. 18 is disclosed, for example, in 3GPP TR 23.758.

The terminal device 10 in the first and second embodiments and modified examples described above may correspond to a UE of FIG. 18. Alternatively, instead, the terminal device 10 in the first and second embodiments and modified examples described above may correspond to at least one of an "application client(s)" or an "edge enabler client" in the UE of FIG. 18. The base station 20 (e.g., gNB) and one or more core network nodes 40 (e.g., UPF, AMF, SMF, and NEF) in the first and second embodiments and modified examples described above may be included in a "3GPP network" of FIG. 18. The application server 30 in the first and second embodiments and modified examples described above may include at least one of an "edge application server(s)" or an "edge enabler server" in an edge data network of FIG. 18. Alternatively, the "edge application server(s)" and the "edge enabler server" in the edge data network may be different application servers. In addition or instead, the application server 30 in the first and second embodiments and modified examples described above may include an edge data network configuration server of FIG. 18. The above-described "application function" may be included in the "3GPP Network" (more specifically, the core network) of FIG. 18, or may be included in the edge data network.

The edge enabler server provides a support function necessary for the edge application server to be operated on the edge data network. The functions of the edge enabler server include:

- provisioning of configuration information that enables the exchange of an application data traffic with the edge application server, and
- provision of information regarding the edge application server, such as availability, to the edge enabler client.

Therefore, the edge enabler server may be referred to as a function (or logical node) including at least a part of the above two functions.

The edge enabler client provides the support function necessary for the application client. The functions of the edge enabler client include:

- acquisition and provisioning of configuration information that enables the exchange of the application data traffic with the edge application server, and
- detection of the edge application server available in the edge data network.

Therefore, the edge enabler client may be referred to as a function (or logical node) including at least a part of the above two functions.

The edge enabler server exposes a location reporting API to the edge application server. The exposure is performed to support tracking and checking of a valid location of the UE. For the location reporting API exposed by the edge enabler server, an API (e.g., northbound API) can be relayed (relayed or forwarded) in the NEF to monitor the location of the UE (an event related to the location). The edge application server can request the location reporting API for one-time reporting (single reporting) to check the location of the current UE. The edge application server can also request the location reporting API for continuous reporting to track the location of the UE.

Figure 19:
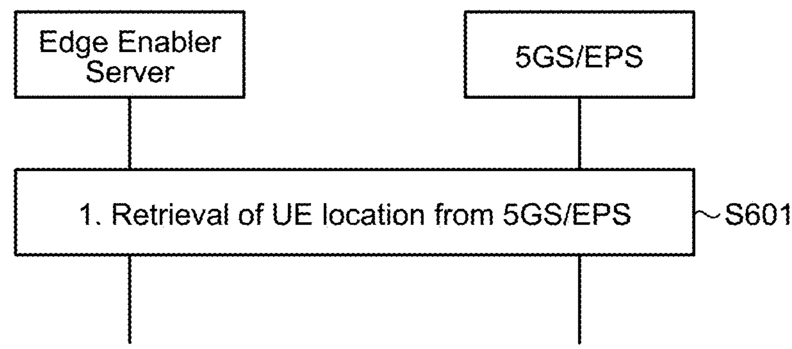
FIG. 19 is a sequence diagram illustrating an example of a processing procedure of a communication system according to a third embodiment of the present disclosure.

FIG. 19 is a sequence diagram illustrating an example of a processing procedure of a communication system according to the third embodiment of the present disclosure. FIG. 19 illustrates an example of a procedure for detection or acquisition of the location of the UE (terminal device 10) by the edge enabler server from a 3GPP system (the base station 20, the network including the core network node 40, or the system in the first and second embodiments and modified examples described above). This sequence may be performed via a reference point "EDGE-2" as described in FIG. 18. Note that the 3GPP system is also referred to as the 3GPP network. Further, the sequence diagram of FIG. 19 may be at least one detailed example of Step S101 and Step S106 of the sequence illustrated in FIG. 8 in the first embodiment.

In Step S601, the edge enabler server interacts (e.g., communication) with the 3GPP system (e.g., 5GS or EPS) to acquire the location of the UE. For example, the edge enabler server can use the API exposed by the NEF. The edge enabler server can request the 3GPP system to perform continuous location reporting for updating location information of the UE in order to avoid repeated requests for location reporting to the 3GPP system. As a result, the edge enabler server can detect the latest location of the UE at any time. The location information of the UE provided by the 3GPP system to the edge enabler server may include at least one of GPS coordinates, a cell ID, a tracking area ID, or information indicating an address (street or district). In addition or instead, the location information of the UE provided by the 3GPP system to the edge enabler server may include the beam identifier (e.g., SSB index) in the first and second embodiments and modified examples described above. An index of the CSI-RS or an index of a positioning reference signal may be included instead of the SSB index.

The edge enabler server can consider granularity of the location information (e.g., GPS coordinates, a cell ID, a tracking area ID, an address, and a beam identifier (e.g., SSB index)) requested by the edge application server.

Note that a detailed example of provision of the location information of the UE from the 3GPP system to the edge enabler server in Step S601 of FIG. 19 will be described later.

Figure 20:
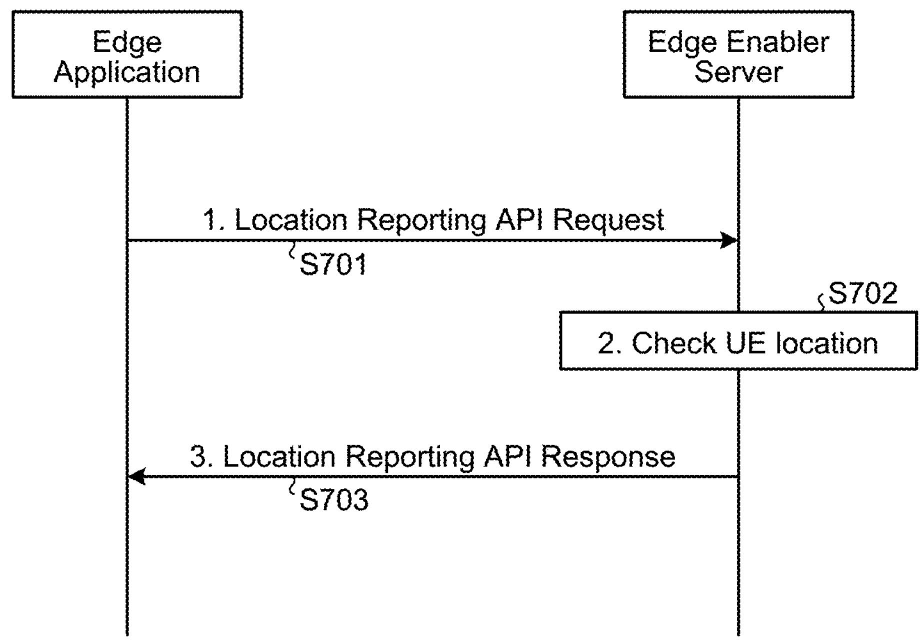
FIG. 20 is a sequence diagram illustrating an example of a processing procedure of the communication system according to the third embodiment of the present disclosure.

FIG. 20 is a sequence diagram illustrating an example of a processing procedure of the communication system according to the third embodiment of the present disclosure.

FIG. 20 illustrates an example in which the edge application server acquires a UE (terminal device 10) location report from the edge enabler server via the location reporting API described above. This sequence may be performed via a reference point "EDGE-3" as described in FIG. 18. Further, the sequence diagram of FIG. 20 may be at least one detailed example of Step S101 and Step S106 of the sequence illustrated in FIG. 8 in the first embodiment.

In Step S701, the edge application server transmits a location reporting API Request message to the edge enabler server to request the location reporting API. This message includes information regarding the identifier and location of the UE (terminal device 10) (e.g., position granularity). The position granularity indicates a format of the reported location information (e.g., at least one of GPS coordinates, a cell ID, a tracking area ID, information indicating an address (street or district), or a beam identifier (e.g., SSB index)).

In Step S702, the edge enabler server checks the location of the UE (terminal device 10).

In Step S703, the edge enabler server considers the granularity of the requested location and returns the location information (e.g., at least one of GPS coordinates, a cell ID, a tracking area ID, and information indicating an address (street or district), or a beam identifier (e.g., SSB index)) of the UE (terminal device 10) as a response message (location reporting API response message). The response message may include a time stamp of the location of the UE (terminal device 10).

Note that the location information of the UE (terminal device 10) does not have to be reported based on an explicit request from the edge application server. For example, the edge application server may subscribe to the location reporting API for the edge enabler server. In this case, the edge enabler server may report the location information (e.g., at least one of GPS coordinates, a cell ID, a tracking area ID, and information indicating an address (street or district), or a beam identifier (e.g., SSB index)) of the UE (terminal device 10) to the edge application server when the edge enabler server detect the location information of the UE (terminal device 10).

Further, the operation described with respect to the sequence diagram illustrated in FIG. 19 and the operation described with respect to the sequence diagram illustrated in FIG. 20 may be at least partially combined with each other. The combination thereof may be a detailed example of the operation of at least one of Step S101 or Step S106 of the sequence illustrated in FIG. 8 in the first embodiment described above.

Further, in the present embodiment, the location information of the UE (terminal device 10) is provided from the 3GPP system to the edge application server via the reference point "EDGE-2" and the reference point "EDGE-3", but the present invention is not limited thereto. For example, the provision of the location information of the UE (terminal device 10) from the 3GPP system to the edge application server may be performed directly from the 3GPP system to the edge application server via a reference point "EDGE-7". Alternatively, instead, for example, the provision of the location information of the UE (terminal device 10) from the 3GPP system to the edge application server may be performed via reference points "EDGE-8", "EDGE-6", and "EDGE-3".

4. Fourth Embodiment

In a fourth embodiment, application examples of the first, second, and third embodiments and modified examples will be described. More specifically, a detailed example of provision of the location information of the UE from the 3GPP system to the Edge Enabler Server in Step S601 of FIG. 19 in the third embodiment will be described later.

In the present embodiment, an NR Positioning Protocol A (NRPPa) specified in 3GPP TS 38.455 may be used for the location information of the UE from the 3GPP system to the Edge Enabler Server. The NRPPa defines a protocol related to location information between an NG-RAN node (e.g., the base station 20 described above or below) and a Location Management Function (LMF), and provides at least the following two functions:

- Enhanced Cell-ID (E-CID (positioning method)) Location Information Transfer, and
- Observed Time Difference of Arrival (OTDOA) Information Transfer.

That is, even in a case where the UE location information reported from the NG-RAN node to the LMF is provided to the Edge Enabler Server (or Edge Application server or Edge Data Network Configuration Server) via the NEF or directly using the API. Note that the LMF may be the core network node 40 (e.g., a node included in 5 GS/EPS in FIG. 19) described above or to be described later.

The E-CID Location Information Transfer in the NRPPa allows the NG-RAN node to exchange the location information with the LMF for E-CID positioning. The E-CID Location Information Transfer includes the following procedures:

a) E-CID Measurement Initiation,
b) E-CID Measurement Failure Indication,
c) E-CID Measurement Report, and
d) E-CID Measurement Termination.

The OTDOA Information Transfer in the NRPPa allows the NG-RAN node to exchange the location information with the LMF for OTDOA positioning. The OTDOA Information Transfer includes an OTDOA Information Exchange procedure.

Figure 21:
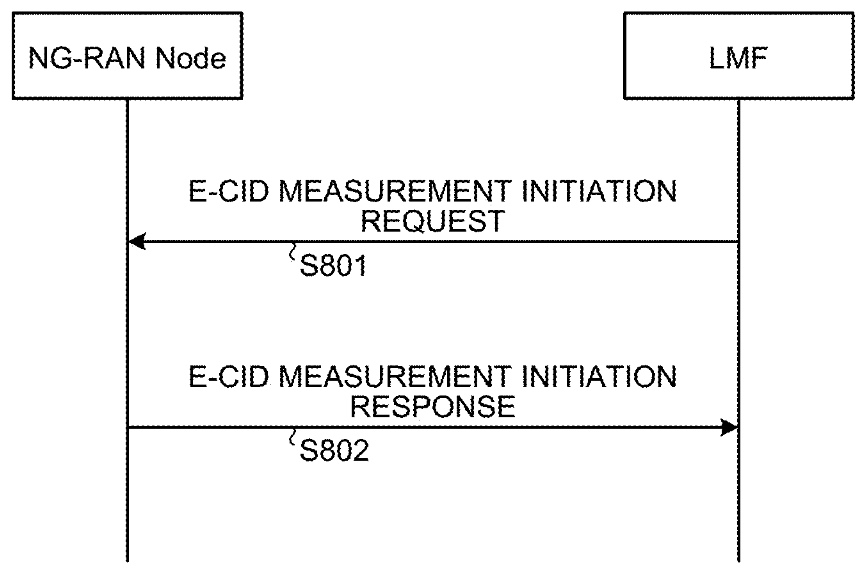
FIG. 21 is a sequence diagram illustrating an enhanced cell-ID (E-CID) measurement initiation procedure.

FIG. 21 is a sequence diagram illustrating the E-CID Measurement Initiation procedure.

In Step S801 of FIG. 21, the LMF transmits an E-CID Measurement Initiation Request message to the NG-RAN node. The E-CID Measurement Initiation Request message includes an Information Element (IE) "Message Type", an IE "NRPPa Transaction ID", an IE "LMF UE Measurement ID", and an IE "Report Characteristics", and may further include at least one of an IE "Measurement Periodicity" or an IE "Measurement Quantities" (including at least one IE "Measurement Quantities Item"). The IE "Measurement Quantities Item" specifies the type of Measurement Quantity to be reported to the NG-RAN. In the IE "Measurement Quantities Item", at least one of Cell-ID, an Angle of Arrival, Timing Advance Type 1, Timing Advance Type 2, RSRP, or RSRQ is set. In the present embodiment, in addition to or instead of these, a beam identifier (e.g., SSB Index) may be set in the IE "Measurement Quantities Item". The SSB Index may be an identifier of the best beam for the terminal device 10 described above or below.

In a case where the NG-RAN node can initiate the requested E-CID measurement, in Step S802, the NG-RAN node transmits an E-CID MEASUREMENT INITIATION RESPONSE message to the LMF. The E-CID MEASUREMENT INITIATION RESPONSE message includes an IE "Message Type", an IE "NRPPa Transaction ID", an IE "LMF UE Measurement ID", and an IE "RAN UE Measurement ID", and may further include at least one of an IE "E-CID Measurement Result" or an IE "Cell Portion ID". The IE "E-CID Measurement Result" includes a Serving Cell ID (an NG-RAN Cell Global Identifier of the serving cell) and a Serving Cell Tracking Area Code (TAC), and may further include an IE "NG-RAN Access Point Position". The IE "NG-RAN Access Point Position" is used to identify the geographic location of the NG-RAN node. The IE "NG-RAN Access Point Position" may indicate, for example, location information for identifying locations of a plurality of base stations 20 set in the stadium ST described above or below. The IE "Cell Portion ID" indicates the location (cell portion) of a target UE (terminal device 10) in a cell. The current specifications specify that the Cell Portion ID can be set to any of the integers of 0, 1, . . . , and 4095. The Cell Portion ID may correspond to the identifier of the best beam (e.g., SSB Index) for the terminal device 10 described above or below. That is, the value of the SSB Index (e.g., 0, 1, . . . , or 64) and the value of Cell Portion ID may be matched or may be associated with each other.

Note that, in a case where "OnDemand" is set in the IE "Report Characteristics" in the E-CID Measurement Initiation Request message, the NG-RAN node may include, in the E-CID MEASUREMENT INITIATION RESPONSE message to be returned, at least one of the IE "E-CID Measurement Result" or the IE "Cell Portion ID".

In a case where "Periodic" is set in the IE "Report Characteristics" in the E-CID Measurement Initiation Request message, the NG-RAN node reports, to the LMF, at least one of the IE "E-CID Measurement Result" or the IE "Cell Portion ID" described above by using the E-CID Measurement Report procedure.

Figure 22:
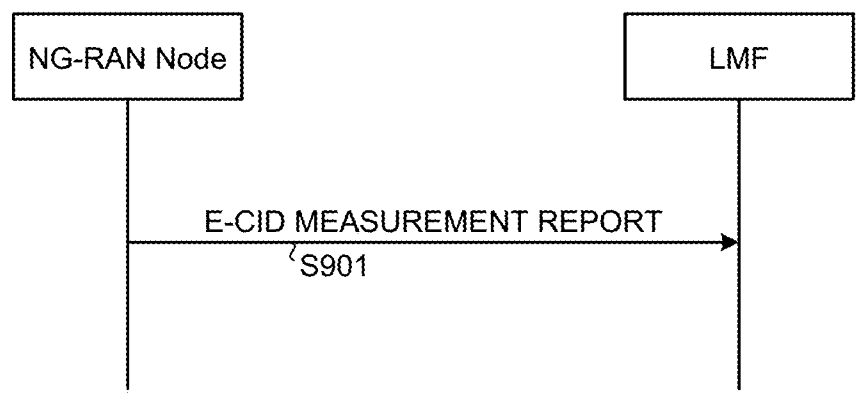
FIG. 22 is a sequence diagram illustrating an E-CID measurement report procedure.

FIG. 22 is a sequence diagram illustrating the E-CID Measurement Report procedure.

In Step S901 of FIG. 22, the NG-RAN node (e.g., base station 20) transmits an E-CID MEASUREMENT REPORT message to the LMF. The E-CID MEASUREMENT REPORT message may include at least one IE that is the same as the IE contained in the E-CID MEASUREMENT INITIATION RESPONSE message described above.

In a case where the location information of the UE (e.g., terminal device 10) provided from the NG-RAN node (e.g., base station 20) to the LMF (e.g., core network node 40) is OTDOA information, the OTDOA Information Exchange procedure is used as described above.

Figure 23:
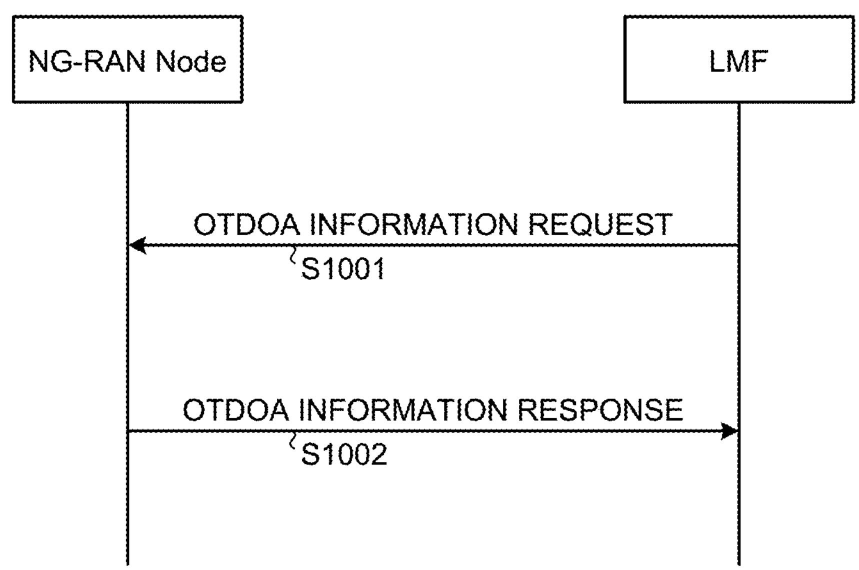
FIG. 23 is a sequence diagram illustrating an observed time difference of arrival (OTDOA) information exchange procedure.

FIG. 23 is a sequence diagram illustrating the OTDOA Information Exchange procedure.

In Step S1001 of FIG. 23, the LMF transmits an OTDOA INFORMATION REQUEST message to the NG-RAN node. In Step S1002, in response to reception of this message, the NG-RAN node transmits an OTDOA INFORMATION RESPONSE message to the LMF. The OTDOA INFORMATION RESPONSE message contains at least one of an IE "Message Type", an IE "NRPPa Transaction ID", or an IE "OTDOA Cells". The IE "OTDOA Cells" indicate a Served cell(s) or a Served transmission point(s) that broadcasts a Positioning Reference Signal (PRS). The Served cell(s) refers to one or more cells served by the NG-RAN node (e.g., base station 20). The Served transmission point(s) indicates one or more transmission points (e.g., antennas) provided in the NG-RAN node (e.g., base station 20) (e.g., the gNB-DU described above or below). The IE "OTDOA Cells" includes one or more pieces of OTDOA Cell Information. The OTDOA Cell Information may include at least one of a cell ID (e.g., NG-RAN GlobalCell Identifier), frequency information, bandwidth information, an IE "NG-RAN Access Point Position", a PRS ID, or a transmission point (TP) ID. In addition, the OTDOA Cell Information may include a beam identifier (e.g., SSB Index) described above or described above. In addition or instead, the PRS ID included in the OTDOA Cell Information may be matched or be associated with the beam identifier (e.g., SSB Index) described above or described above. Note that the beam identifier described above or described above may be the identifier of the best beam for the terminal device 10 described above or below.

By these procedures described in the present embodiment, the identifier of the best beam for the terminal device 10 is provided from the base station 20 to the core network node 40. Therefore, the application server 30 described above or below can acquire the SSB Index of the best beam for the terminal device 10 to which the AR image data is provided, from the core network 40 via the API or the like (for example, using the procedure of the third embodiment).

The procedure for providing the UE location information from the NG-RAN node to the LMF in the present embodiment may be performed independently of other embodiments (e.g., the first, second, and third embodiments and modified examples) or may be performed in combination with other embodiments.

5. Other Embodiments

The existing self-position estimation method may be applied to the virtual object alignment in the first and second embodiments and modified examples described above.

As a specific example of self-position estimation, in the terminal device 10 (e.g., AR device), the imaging unit 140 such as a camera provided in the terminal device 10 captures an image of a marker or the like whose size is known on a real object in a real space. Then, the terminal device 10 analyzes the captured image to estimate at least one of a relative position and posture of the terminal device 10 with respect to the marker (or the real object on which the marker is presented). Note that, in the following description, a case where the terminal device 10 estimates the position and posture thereof will be described, but the terminal device 10 may estimate only one of the position and the posture.

Specifically, it is possible to estimate a relative direction of the imaging unit 140 (or the terminal device 10 including the imaging unit 140) with respect to the marker according to a direction of the marker in the image (for example, a direction of the shape or the like of the marker). In a case where the size of the marker is known, a distance between the marker and the imaging unit 140 (that is, the terminal device 10 including the imaging unit 140) can be estimated according to the size of the marker in the image. More specifically, when the marker is imaged from a greater distance, the marker is imaged in a smaller size. Further, a range in the real space in the image at this time can be estimated based on an angle of view of the imaging unit 140. By utilizing the above characteristics, the distance between the marker and the imaging unit 140 can be calculated back according to the size of the marker in the image (in other words, a proportion of the marker in the angle of view). With the above configuration, the terminal device 10 can estimate the relative position and posture thereof with respect to the marker.

Further, for example, the terminal device 10 according to the first and second embodiments and modified examples described above may be provided with an acceleration sensor and an angular velocity sensor (gyro sensor), and may be configured to be able to detect the motion of the head of the user who wears the terminal device 10 (in other words, the motion of the terminal device 10 itself). As a specific example, the terminal device 10 may detect components in a yaw direction, a pitch direction, and a roll direction as the motion of the head of the user, thereby recognizing a change of at least one of the position and the posture of the head of the user.

Further, a technology called simultaneous localization and mapping (SLAM) may be used for the self-position estimation of the terminal device 10. The SLAM is a technology of performing self-location estimation and environment map creation in parallel by using the imaging unit 140 such as a camera, various sensors, and an encoder. As a more specific example, in the SLAM (particularly, visual SLAM), a three-dimensional shape of an imaged scene (or subject) is sequentially restored based on a moving image captured by the imaging unit 140. Then, by associating the restoration result of the imaged scene with a result of detecting the position and posture of the imaging unit 140, a map of the surrounding environment is created and the position and posture of the imaging unit 140 (or the terminal device 10) in the environment are estimated. Note that the position and posture of the imaging unit 140 can be estimated as information indicating a relative change based on the detection result of the sensor by, for example, providing various sensors such as an acceleration sensor and an angular velocity sensor in the terminal device 10. It is a matter of course that in a case where the position and posture of the imaging unit 140 can be estimated, the method is not necessarily limited to the method based on the detection results of various sensors such as an acceleration sensor and an angular velocity sensor.

With the above configuration, for example, a result of estimating the relative position and posture of the terminal device 10 with respect to the marker based on the result of imaging the known marker by the imaging unit 140 may be used for initialization processing or position correction in the SLAM described above. With such a configuration, the terminal device 10 can estimate the position and posture thereof with respect to the marker (or the real object on which the marker is presented) by performing self-position estimation based on the SLAM that has received a result of previously performed initialization or position correction even in a situation where the marker is not within the angle of view of the imaging unit 140.

The above method may be used together with the alignment method in the first and second embodiments and modified examples described above. For example, the alignment method in the first and second embodiments and modified examples described above may be used for the initialization processing and position correction in the SLAM. Highly accurate alignment of the virtual object with respect to the real object can be implemented by a plurality of combinations of the first and second embodiments and modified examples described above and the known methods.

In addition to the above-described stadium ST, examples of the large-scale facility may include the following facilities. For example, examples of the large-scale facility may include a concert hall, a theater, a live house, a plaza, a stadium, a circuit, a racetrack, a bicycle racetrack, a skate link, a movie theater, and an arena.

Examples of the synchronization signal include the SSB, the CSI-RS, the positioning reference signal, and the like. That is, in some of the embodiments and modified examples described above, the CSI-RS or the positioning reference signal may be used instead of the SSB. The SSB Index in some of the embodiments described above may be replaced with a CSI-RS identifier (e.g., CSI-RS resource indicator (CRI)) or a PRS identifier (PRS-ID).

In addition, the first and second embodiments and modified examples described above have been described mainly for 3GPP 5G NR Standalone, but the application is not limited thereto. For example, the first and second embodiments and modified examples described above may be applied mainly to 3GPP 5G NR Non-Standalone.

As described above, a cell provided by the base station 20 is called a Serving cell. The Serving cell includes a primary cell (PCell) and a secondary cell (SCell). In a case where Dual Connectivity (e.g. EUTRA-EUTRA Dual Connectivity, EUTRA-NR Dual Connectivity (ENDC), EUTRA-NR Dual Connectivity with 5GC, NR-EUTRA Dual Connectivity (NEDC), or NR-NR Dual Connectivity) is provided to the UE (e.g., terminal device 10), the PCell and zero or one or more SCells provided by a master node (MN) are referred to as a master cell group. Further, the Serving cell may include a primary secondary cell or a primary SCG Cell (PSCell). That is, in a case where the Dual Connectivity is provided to the UE, the PSCell and zero or one or more SCells provided by a secondary node (SN) are referred to as a secondary cell group (SCG). Unless specially configured (e.g., physical uplink control channel (PUCCH) on SCell), the PUCCH is transmitted by the PCell and the PSCell, not by the SCell. Radio link failure is detected in the PCell and the PSCell, and is not detected (does not have to be detected) in the SCell. Since the PCell and the PSCell have a special role in the Serving cell(s) as described above, they are also called special cells (SpCells). One downlink component carrier and one uplink component carrier may be associated with one cell. Further, a system bandwidth corresponding to one cell may be divided into a plurality of bandwidth parts. In this case, one or more bandwidth parts may be set in the UE and one bandwidth part may be used in the UE as an active BWP. Further, radio resources (for example, a frequency band, numerology (subcarrier spacing), and slot configuration) that can be used by the terminal device 10 may be different for each cell, each component carrier, or each BWP.

That is, the base station 20 in the first and second embodiments and modified examples described above may be the MN or SN of the NR-NR DC as the 3GPP 5G NR Standalone, or may be the gNB (en-gNB) in the ENDC, the ENDC with 5GC, or the NEDC as the 3GPP 5G NR Non-Standalone.

Furthermore, local 5G may be applied to the communication systems in some of the embodiments and modified examples described above. For example, the base station (gNB) 20 (e.g., a plurality of gNBs arranged in the stadium ST), the core network node (UPF) 40, and the application server 30 in FIG. 4 may be operated as network nodes constituting the local 5G. For example, the stadium ST may be a local 5G service area. More specifically, a public land mobile network (PLMN) to which a plurality of gNBs arranged in the stadium ST and the UPF connected to the gNB belong may be different from a PLMN of a mobile network provided by a mobile network operator (MNO), other than the stadium ST. In this case, the location information (i.e., beam identifier) of the terminal device 10 provided to the application server 30 via the base station 20 and the core network node 40 may be provided to the application server 30 via the base station 20 and the core network node 40 together with information indicating the local 5G network (e.g., an identifier of the local 5G, an ID of the PLMN that provides the local 5G, an identifier (global ID) of the base station 20 (e.g., gNB) belonging to the PLMN that provides the local 5G, and an identifier (global ID) of the core network node 40). The provision method may use the procedures, messages, and protocols in some of the embodiments described above. That is, the information indicating the local 5G network described above may be included in the message in some of the embodiments described above.

6. Supplementary Description

As described above, the preferred embodiments of the present disclosure have been described in detail with reference to the accompanying drawings, but the technical scope of the present disclosure is not limited to such examples. It will be apparent to those skilled in the art to which the present disclosure pertains that various modifications or alterations can be conceived within the scope of the technical idea described in the claims and it is naturally understood that these modifications or alterations fall within the technical scope of the present disclosure.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the present technology can also have the following configurations.

(1)

A terminal device comprising:

a transceiver;

a camera for imaging a real object;

a display for displaying an augmented reality image in which a virtual object is superimposed on the real object imaged by the camera; and a processor, wherein the processor is configured to receive at least one of a plurality of synchronization signals beamformed in directions different from each other and transmitted from a base station via the transceiver, determine a first synchronization signal whose radio quality satisfies a predetermined threshold from the at least one received synchronization signal, transmit a random access preamble by using a random access occasion corresponding to the first synchronization signal in order to report the first synchronization signal to the base station, and receive information regarding the augmented reality image from an application server after a random access processing procedure including the transmission of the random access preamble is completed, the information regarding the augmented reality image is correction information used for displaying the augmented reality image, or augmented reality image data in which the virtual object is aligned with respect to the real object based on the correction information, in a case where the information regarding the augmented reality image is the correction information, the processor aligns the virtual object with respect to the real object by using the correction information, generates the augmented reality image, and outputs the augmented reality image to the display, in a case where the information regarding the augmented reality image is the augmented reality image data in which the virtual object is aligned with respect to the real object based on the correction information, the processor outputs the augmented reality image to the display based on the received augmented reality image data, and the correction information is information for indicating a position of an area covered by the beamformed and transmitted first synchronization signal with respect to the real object, and includes information regarding a direction of the virtual object to be displayed on the display in the area and a distance from the real object to the area.

(2)

The terminal device according to (1), wherein the correction information is associated with an index of the beamformed and transmitted first synchronization signal.

(3)

The terminal device according to (1) or (2), wherein the virtual object is a point cloud object, the point cloud object includes a plurality of partial point cloud objects, and the plurality of partial point cloud objects have definition according to a view of a user.

(4)

The terminal device according to (3), wherein the plurality of partial point cloud objects include a first partial point cloud object that is viewable by the user, and an octree depth of the first partial point cloud object is set to have higher definition than the other partial point cloud objects.

(5)

An application server comprising:

a network interface; and a processor that generates an augmented reality image in which a virtual object is superimposed on a real object imaged by a camera mounted on a terminal device, wherein the processor is configured to acquire, via a base station, information on a first synchronization signal determined by the terminal device from at least one of a plurality of synchronization signals beamformed in directions different from each other and transmitted from the base station, and transmit information regarding the augmented reality image to be displayed on a display mounted on the terminal device to the terminal device via the base station, the information regarding the augmented reality image is correction information to be used for displaying the augmented reality image associated in advance with the first synchronization signal, or augmented reality image data in which the virtual object is aligned with respect to the real object based on the correction information, in a case where the information regarding the augmented reality image is the correction information, the augmented reality image data and the correction information are transmitted to the terminal device to cause the terminal device to align the virtual object with respect to the real object by using the correction information, in a case where the information regarding the augmented reality image is the augmented reality image data, the processor aligns the virtual object with respect to the real object by using the correction information, generates the augmented reality image, and transmits the augmented reality image to the terminal device, and the correction information is information for indicating a position of an area covered by the beamformed and transmitted first synchronization signal with respect to the real object, and includes information regarding a direction of the virtual object to be displayed on the display in the area and a distance from the real object to the area.

(6)

The application server according to (5), wherein the correction information is associated with an index of the beamformed and transmitted first synchronization signal.

(7)

The application server according to (5) or (6), wherein the virtual object is a point cloud object, the point cloud object includes a plurality of partial point cloud objects, and the plurality of partial point cloud objects have definition according to a view of a user.

(8)

The application server according to (7), wherein the plurality of partial point cloud objects include a first partial point cloud object that is viewable by the user, and an octree depth of the first partial point cloud object is set to have higher definition than the other partial point cloud objects.

(9)

A receiving method for displaying an augmented reality image on a terminal device including a transceiver, a camera for imaging a real object, a display for displaying the augmented reality image in which a virtual object is superimposed on the real object imaged by the camera, and a processor, the receiving method comprising:

receiving at least one of a plurality of synchronization signals beamformed in directions different from each other and transmitted from a base station via the transceiver;

determining a first synchronization signal whose radio quality satisfies a predetermined threshold from the at least one received synchronization signal;

transmitting a random access preamble by using a random access occasion corresponding to the first synchronization signal in order to report the first synchronization signal to the base station; and receiving information regarding the augmented reality image from an application server after a random access processing procedure including the transmission of the random access preamble is completed, wherein the information regarding the augmented reality image is correction information to be used for displaying the augmented reality image, or augmented reality image data in which the virtual object is aligned with respect to the real object based on the correction information, in a case where the information regarding the augmented reality image is the correction information, the virtual object is aligned with respect to the real object by using the correction information, the augmented reality image is generated, and the augmented reality image is output to the display, in a case where the information regarding the augmented reality image is the augmented reality image data in which the virtual object is aligned with respect to the real object based on the correction information, the processor outputs the augmented reality image to the display based on the received augmented reality image data, and the correction information is information for indicating a position of an area covered by the beamformed and transmitted first synchronization signal with respect to the real object, and includes information regarding a direction of the virtual object to be displayed on the display in the area and a distance from the real object to the area.

(10)

A transmitting method for transmitting, by an application server including a network interface and a processor that generates an augmented reality image in which a virtual object is superimposed on a real object imaged by a camera mounted on a terminal device, information regarding the augmented reality image, the transmitting method comprising:

acquiring, via a base station, information on a first synchronization signal determined by the terminal device from at least one of a plurality of synchronization signals beamformed in directions different from each other and transmitted from the base station; and transmitting the information regarding the augmented reality image to be displayed on a display mounted on the terminal device to the terminal device via the base station, wherein the information regarding the augmented reality image is correction information to be used for displaying the augmented reality image associated in advance with the first synchronization signal, or augmented reality image data in which the virtual object is aligned with respect to the real object based on the correction information, in a case where the information regarding the augmented reality image is the correction information, the augmented reality image data and the correction information are transmitted to the terminal device to cause the terminal device to align the virtual object with respect to the real object by using the correction information, in a case where the information regarding the augmented reality image is the augmented reality image data, the virtual object is aligned with respect to the real object by using the correction information, the augmented reality image is generated, and the augmented reality image is transmitted to the terminal device, and the correction information is information for indicating a position of an area covered by the beamformed and transmitted first synchronization signal with respect to the real object, and includes information regarding a direction of the virtual object to be displayed on the display in the area and a distance from the real object to the area.

REFERENCE SIGNS LIST

10 UE
20 BASE STATION
30 APPLICATION SERVER
40 CORE NETWORK NODE
100, 200 ANTENNA UNIT
110, 210 COMMUNICATION UNIT (TRANSCEIVER)
120, 230 STORAGE UNIT (MEMORY)
130 DISPLAY UNIT (DISPLAY)
140 IMAGING UNIT (CAMERA)
150, 240, 330 CONTROL UNIT (PROCESSOR)
220, 310 NETWORK COMMUNICATION UNIT (NW INTERFACE)

The invention claimed is:

1. A Next Generation Radio Access Network (NG-RAN) node configured to support New Radio Positioning Protocol A (NRPPa), the NG-RAN node comprising:

a network interface configured to communicate with a Location Management Function (LMF) node; and circuitry configured to receive, from the LMF, an enhanced cell ID (E-CID) MEASUREMENT INITIATION REQUEST message including a Report Characteristics Information Element (IE); and a Measurement Quantities Item IE corresponding to a request for the NG-RAN node to report first information indicating Synchronization Signal (SS)/Physical Broadcast Channel (PBCH) block index (SSB index) for location of a User Equipment (UE); and send, to the LMF, E-CID MEASUREMENT INITIATION RESPONSE message containing the first information indicating the SSB index, in a case that the received Report Characteristics IE is set to OnDemand, or send, to the LMF, E-CID MEASUREMENT REPORT message containing the first information indicating the SSB index, in a case that the received Report Characteristics IE is set to Periodic.

2. The NG-RAN node of claim 1, wherein the first information indicating the SSB index is a beam identifier which indicates a beam for the UE that has a radio quality above a predetermined threshold.

3. The NG-RAN node of claim 1, wherein one or more SSBs each indicated by the SSB index is transmitted from NG-RAN node to the UE.

4. The NG-RAN node of claim 1, wherein the E-CID MEASUREMENT INITIATION RESPONSE message contains Cell Portion Identifier (ID), in the case that the received Report Characteristics IE is set to OnDemand, or the E-CID MEASUREMENT REPORT message contain contains the Cell Portion ID, in the case that the received Report Characteristics IE is set to Periodic.

5. The NG-RAN node of claim 4, wherein the Cell Portion ID corresponds the first information indicating the SSB index.

6. A Location Management Function (LMF) configured to support New Radio Positioning Protocol A (NRPPa), the LMF comprising:

a network interface configured to communicate with a Next Generation Radio Access Network (NG-RAN) node; and circuitry configured to send, to the NG-RAN node, enhanced cell ID (E-CID) MEASUREMENT INITIATION REQUEST message including a Report Characteristics Information Element (IE); and a Measurement Quantities Item IE that indicates to request the NG-RAN to report first information indicating Synchronization Signal (SS)/Physical Broadcast Channel (PBCH) block index (SSB index) for location of a User Equipment (UE); and receive, from the NG-RAN node, E-CID MEASUREMENT INITIATION RESPONSE message containing the first information indicating the SSB index, in a case that the received Report Characteristics IE is set to OnDemand, or receive, from the NG-RAN node, E-CID MEASUREMENT REPORT message containing the first information indicating the SSB index, in a case that the received Report Characteristics IE is set to Periodic.

7. The LMF of claim 6, wherein the first information indicating the SSB index is beam identifier which indicates a beam for the UE that has a radio quality above a predetermined threshold.

8. The LMF of claim 6, wherein one or more SSBs each indicated by the SSB index is transmitted from NG-RAN node to the UE.

9. The LMF of claim 6, wherein the E-CID MEASUREMENT INITIATION RESPONSE message contains Cell Portion Identifier (ID), in the case that the received Report Characteristics IE is set to OnDemand, or the E-CID MEASUREMENT REPORT message contain contains the Cell Portion ID, in the case that the received Report Characteristics IE is set to Periodic.

10. The LMF of claim 9, wherein the Cell Portion ID corresponds the first information indicating the SSB index.

11. A User Equipment (UE) comprising:

a radio transceiver configured to communicate with a Next Generation Radio Access Network (NG-RAN) node supporting New Radio Positioning Protocol A (NRPPa), wherein first information indicating Synchronization Signal (SS)/Physical Broadcast Channel (PBCH) block index (SSB index) for location of the UE is indicated by Measurement Quantities Item Information Element (IE) which is used by a Location Management Function (LMF) to request the NG-RAN to report the SSB index to the LMF, wherein the Measurement Quantities Item IE and Report Characteristics IE are contained in enhanced cell ID (E-CID) MEASUREMENT INITIATION REQUEST message sent from the LMF to the NG-RAN node, and the first information indicating the SSB index is contained in E-CID MEASUREMENT INITIATION RESPONSE message sent from the NG-RAN node to the LMF, in a case that the received Report Characteristics IE is set to OnDemand, or the first information indicating the SSB index is contained in E-CID MEASUREMENT REPORT message sent from the NG-RAN node to the LMF, in a case that the received Report Characteristics IE is set to Periodic.

12. The UE of claim 11, wherein the first information indicating the SSB index is beam identifier which indicates a beam for the UE that has a radio quality above a predetermined threshold.

13. The UE of claim 11, wherein the radio transceiver is further configured to receive one or more SSBs each indicated by the SSB index.

14. The UE of claim 11, wherein the E-CID MEASUREMENT INITIATION RESPONSE message contains Cell Portion Identifier (ID), in the case that the received Report Characteristics IE is set to OnDemand, or the E-CID MEASUREMENT REPORT message contain contains the Cell Portion ID, in the case that the received Report Characteristics IE is set to Periodic.

15. The UE of claim 14, wherein the Cell Portion ID corresponds the first information indicating the SSB index.

16. A method for a Next Generation Radio Access Network (NG-RAN) node configured to support New Radio Positioning Protocol A (NRPPa), the method comprising:

communicating with a Location Management Function (LMF) node; and receiving, from the LMF, enhanced cell ID (E-CID) MEASUREMENT INITIATION REQUEST message including a Report Characteristics Information Element (IE); and a Measurement Quantities Item IE that indicates to request the NG-RAN to report first information indicating Synchronization Signal (SS)/Physical Broadcast Channel (PBCH) block index (SSB index) for location of a User Equipment (UE); and sending, to the LMF, E-CID MEASUREMENT INITIATION RESPONSE message containing the first information indicating the SSB index, upon determining that the received Report Characteristics IE is set to OnDemand, or sending, to the LMF, E-CID MEASUREMENT REPORT message containing the first information indicating the SSB index, upon determining that the received Report Characteristics IE is set to Periodic.

17. A method for a Location Management Function (LMF) configured to support New Radio Positioning Protocol A (NRPPa), the method comprising:

communicating with a Next Generation Radio Access Network (NG-RAN) node; and sending, to the NG-RAN node, enhanced cell ID (E-CID) MEASUREMENT INITIATION REQUEST message including a Report Characteristics Information Element (IE); and a Measurement Quantities Item IE that indicates to request the NG-RAN to report first information indicating Synchronization Signal (SS)/Physical Broadcast Channel (PBCH) block index (SSB index) for location of a User Equipment (UE); and receiving, from the NG-RAN node, E-CID MEASUREMENT INITIATION RESPONSE message containing the first information indicating the SSB index, upon determining that the received Report Characteristics IE is set to OnDemand, or receiving, from the NG-RAN node, E-CID MEASUREMENT REPORT message containing the first information indicating the SSB index, upon determining that the received Report Characteristics IE is set to Periodic.

18. A method for a User Equipment (UE), the method comprising:

communicating with a Next Generation Radio Access Network (NG-RAN) node supporting New Radio Positioning Protocol A (NRPPa), wherein first information indicating Synchronization Signal (SS)/Physical Broadcast Channel (PBCH) block index (SSB index) for location of the UE is indicated by Measurement Quantities Item Information Element (IE) which is used by a Location Management Function (LMF) to request the NG-RAN to report the SSB index to the LMF, wherein the Measurement Quantities Item IE and Report Characteristics IE are contained in enhanced cell ID (E-CID) MEASUREMENT INITIATION REQUEST message sent from the LMF to the NG-RAN node, the first information indicating the SSB index is contained in E-CID MEASUREMENT INITIATION RESPONSE message sent from the NG-RAN node to the LMF, upon determining that the received Report Characteristics IE is set to OnDemand, or the first information indicating the SSB index is contained in E-CID MEASUREMENT REPORT message sent from the NG-RAN node to the LMF, upon determining that the received Report Characteristics IE is set to Periodic.

* * * * *